United States Patent
Mathieu et al.

(10) Patent No.: US 12,083,677 B2
(45) Date of Patent: Sep. 10, 2024

(54) ROBOTIC INTERVENTION SYSTEMS

(71) Applicants: John David Mathieu, Saint Germain en Laye (FR); Luke Wissmann, New York, NY (US)

(72) Inventors: John David Mathieu, Saint Germain en Laye (FR); Luke Wissmann, New York, NY (US)

(73) Assignees: John David Mathieu, Saint Germain en Laye (FR); Luke Wissmann, New York, NY (US)

( * ) Notice: Subject to any disclaimer, the term of this patent is extended or adjusted under 35 U.S.C. 154(b) by 556 days.

(21) Appl. No.: 17/352,205

(22) Filed: Jun. 18, 2021

(65) Prior Publication Data

US 2021/0394359 A1 Dec. 23, 2021

Related U.S. Application Data

(60) Provisional application No. 63/041,074, filed on Jun. 18, 2020.

(51) Int. Cl.
*B25J 9/16* (2006.01)
*G05B 19/4155* (2006.01)
(Continued)

(52) U.S. Cl.
CPC .......... *B25J 9/163* (2013.01); *G05B 19/4155* (2013.01); *G06N 5/02* (2013.01); *G06N 20/00* (2019.01); *G05B 2219/50391* (2013.01)

(58) Field of Classification Search
CPC ................. B25J 16/1628; B25J 16/163; B25J 16/1661; B25J 16/1671; B25J 16/1674;
(Continued)

(56) References Cited

U.S. PATENT DOCUMENTS

| 10,248,120 | B1 * | 4/2019 | Siegel | G05D 1/0223 |
| 2012/0265717 | A1 * | 10/2012 | Narayanan | G06F 18/217 706/12 |
| 2019/0096134 | A1 * | 3/2019 | Amacker | B25J 9/1697 |

(Continued)

FOREIGN PATENT DOCUMENTS

| EP | 3539728 A1 | 9/2019 |
| KR | 20140130045 A | 11/2014 |
| WO | 2020079587 A1 | 4/2020 |

OTHER PUBLICATIONS

An International Search Report and Written Opinion of the International Searching Authority on Sep. 28, 2021 in connection with International application No. PCT/US2021/038145.

(Continued)

*Primary Examiner* — Russell Frejd
*Assistant Examiner* — Sara J Lewandroski
(74) *Attorney, Agent, or Firm* — Baker McKenzie

(57) ABSTRACT

Based on data indicative of an area proximate to a robotic device, a scene is generated. Based on information from a knowledge database, a task associated with the scene is identified. A risk threshold is determined based on the scene, the task, and one or more trust thresholds. Based on the risk threshold, a ratio of sub-tasks of the task to be controlled by a user is determined. In accordance with the risk threshold, a user input is received for controlling one or more of the sub-tasks when the ratio dictates that at least one of the sub-tasks requires user intervention.

18 Claims, 18 Drawing Sheets

(51) Int. Cl.
*G06N 5/02* (2023.01)
*G06N 20/00* (2019.01)

(58) Field of Classification Search
CPC .............. B25J 16/1679; B25J 16/1689; G06N 20/00; G05B 2219/50391; G06V 20/20; G06V 20/35; G06V 20/36; G06V 20/38; G06V 20/39; G06V 20/40; G06V 20/41; G06V 20/50; G06V 20/56; G06V 20/58; G06V 20/60; G06V 20/64; G06V 20/68; G06V 20/70; G06V 20/80
See application file for complete search history.

(56) References Cited

U.S. PATENT DOCUMENTS

| | | | | |
|---|---|---|---|---|
| 2021/0072759 | A1* | 3/2021 | Baek | G05D 1/0214 |
| 2021/0383193 | A1* | 12/2021 | Navoni | G06Q 10/06 |
| 2022/0324113 | A1* | 10/2022 | Rose | B25J 9/1689 |
| 2023/0168670 | A1* | 6/2023 | von Reventlow | G05D 1/0231 |
| | | | | 701/2 |

OTHER PUBLICATIONS

Connor Basich et al., "Learning to Optimize Autonomy in Competence-Aware Systems" arxiv.org, Cornell University Library, 201 Olin Library Cornell University Ithaca, NY 14853, Mar. 17, 2020, XP081623331, 9 pages.

Douglas Few et al., ""Seamless Autonomy": Removing autonomy level stratifications" 2008 Conference on Human System Interactions, May 25, 2008. pp. 446-451.

* cited by examiner

ROBOTIC INTERVENTION SYSTEMS

PRIORITY APPLICATION

This application claims the benefit of and priority to U.S. Provisional Application No. 63/041,074, filed Jun. 18, 2020, entitled "Robotic Intervention Systems," the entire contents of which are incorporated herein by reference.

BACKGROUND

Robotic systems have many applications, such as manufacturing, defense, medical, industrial, survey and exploration. On one side of the autonomy spectrum, some of these robotic systems operate autonomously without human involvement (e.g., many manufacturing applications) and at the other end of the spectrum, others are directly controlled by humans.

A robot may be pre-programmed to execute tasks, which are either commanded by direction of a control system guided by a human, semi-autonomously using IF/THEN operators or utilizing artificial intelligence that utilizes sensor data and logic to determine what to do next. Some methods rely on assigning task priorities based on sensory context. The amount of programming to offer robotic systems full autonomy can be extremely expensive; yet allowing humans to directly control robotics is fraught with risk due to potential human error. If the robotic operation is remote, the complexity of control is increased due to bandwidth and latency constraints in the communication channel between the local and remote control systems.

Even when robotic systems have been designed with autonomous features, robotic systems fail or get stuck preventing completion of their task due to unanticipated (not programmed) branches in operations scenarios (e.g., different lighting, sensor failure, unrecognized objects, obstacles, etc.).

It is with respect to these and other considerations that the disclosure made herein is presented.

SUMMARY

The present disclosure relates to, inter alia, computer systems and methods that enable variable levels of autonomy for robotic operations that involve intervention within scenes with underlying structure and variability. In various embodiments, systems and methods are described for utilizing a process knowledge database to enable on-the-fly variable autonomy for robotic systems.

In an embodiment, a process knowledge database may be utilized to generate contextual and semantic labels to enable on-the-fly variable autonomous and collaborative human-machine control. Robotic systems may operate autonomously or semi-autonomously (e.g., supervised by humans) by using motion planning algorithms that utilize a machine learning produced knowledge database to understand a scene and propose alternative motion plans based on semantic information contained therein. In an embodiment, a variable autonomy control system described herein may utilize a process knowledge database to offer scene-based assistance to robotic systems that enables human-robot collaborative teams to balance operational efficiency with inherent risks by executing a high-level task (e.g., flipping a switch) by dividing sub-tasks (e.g., deciding which way to flip, how fast to flip, how to approach the switch, etc.) between the human and machine. Risk thresholds may be dictated, for example, by organizational policies or individual controllers who may have different trust thresholds. The method described herein provides a way to progressively reduce the ratio of sub-tasks controlled by a user over time as a path to full autonomy for human-machine collaborative controlled robotic intervention systems.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying FIGS. In the FIGS., the left-most digit(s) of a reference number identifies the FIG. in which the reference number first appears. The same reference numbers in different FIGS. indicate similar or identical items.

DETAILED DESCRIPTION

Figure 1A:
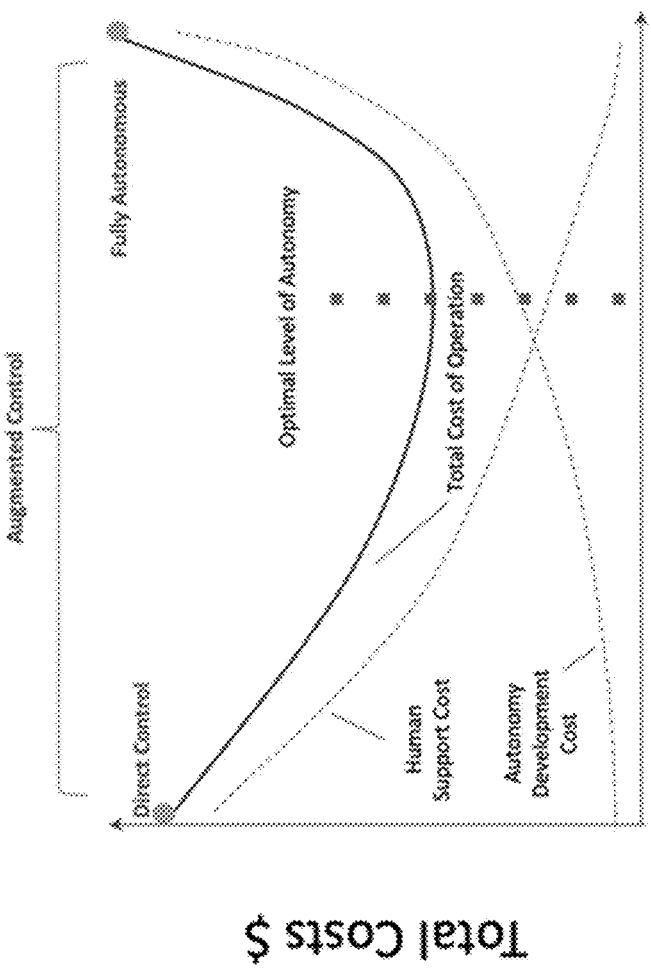
FIG. 1A is a diagram illustrating a trade-off curve according to one embodiment disclosed herein.

While the subject matter described herein is primarily presented in the general context of techniques for providing controlling robotic devices, it can be appreciated that the techniques described herein may apply to any type of autonomous device such as an autonomous vehicle or any type of device with a sensor and/or any type of device embodying the sensors. These and various other features will be apparent from a reading of the following Detailed Description and a review of the associated drawings. Furthermore, the claimed subject matter is not limited to implementations that solve any or all disadvantages noted in any part of this disclosure.

As will be described in more detail herein, it can be appreciated that implementations of the techniques and technologies described herein may include the use of solid state circuits, digital logic circuits, computer component, and/or software executing on one or more devices. Signals described herein may include analog and/or digital signals for communicating a changed state, movement and/or any data associated with motion detection. Furthermore, while the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, servers, and the like.

In the following detailed description, references are made to the accompanying drawings that form a part hereof, and in which are shown by way of illustration specific configurations or examples. Referring now to the drawings, in which like numerals represent like elements throughout the several figures, aspects of a computing system, computer-readable storage medium, and computer-implemented methodologies for providing enhanced control of one or more robots. As will be described in more detail below with respect to the FIGURES, there are a number of applications and services that can embody the functionality and techniques described herein.

One way to balance operational efficiencies with computational complexity and the risk of task failure is to enable humans to collaborate with a robotic system by utilizing variable levels of autonomy in the control system. This may be done by breaking a task (e.g., driving) into sub-tasks (e.g., control of speed, navigation, steering, etc.) and allowing humans to allocate human/machine sub-task responsibility based on perceived risk, trust, and efficiency (e.g., speed control, lane assist, park assist in automobiles).

To understand their surroundings, robotic systems may utilize sensors and special algorithms to create two-dimensional (2D) plan maps and/or three-dimensional (3D) space mapping to provide a 3D representation of the scene, the objects within the robotic system workspace. A "digital twin" may created when a digital 3D representation of the scene is fused with other metadata to create a semantic model. Robotic systems may utilize these digital twins to perform rapid analysis and simulations of prospective motion plans to arrive at the optimal choice.

Machine learning is a field within artificial intelligence that enables the training of machines from data. There are a number of types of machine learning algorithms that have different levels of capabilities, advantages, and disadvantages such as deep learning, gradient boosting, random forest, decision trees, logistic regression and linear regression. Typically, a machine learning engine (utilizing one or more of previously mentioned types) may be implemented that generates a knowledge database that is then utilized to understand or label new data, typically to support a decision. A knowledge cloud may utilize the knowledge database and provides a platform for enabling user systems to access and utilize the information in the knowledge database.

Human-designed systems may exhibit common layouts and structure, such as the cockpits of airplanes and cars or a gas engine or circuit boards. When humans interact with these systems, we typically do not need to exhaustively scan the system to locate/identify objects. Instead, humans use posteriori knowledge gathered from experience to navigate and find objects. Moreover, while robotic systems utilizing machine intelligence may be adept at identifying and/or locating objects in direct view of their sensors, they may have problems locating objects that are not in direct view.

Utilizing mobile robotic platforms with manipulators to enable mobile robotic operations in both controlled environments (e.g., a factory) and less controlled environments (e.g., the field) may pose a myriad of challenges. While humans intuitively know how to correctly grasp objects with various geometries and physical properties, determining the best way to grasp an object based on the end effector, the position of the mobile base, and the position of the target object can be a challenge for robotic systems depending on the level of structure in the robotic systems environment.

Robotic systems frequently utilize an end effector for grasping objects to perform intervention tasks. There are "impactive" end effectors (e.g., jaws, claws, fingers), "ingressive" end effectors (e.g., physically penetrating an object using pins, needles, etc.), "astrictive" end effectors (e.g., using suction or vacuum forces), and "contigutive" end effectors (e.g., using surface tension or adhesives) to pick up objects and perform tasks.

It is desirable for a robotic system to be flexible to interact with a variety of objects, yet interacting with these objects may require alternative grasping strategies based on scene context, the state or pose of the object, and the type of end effector used.

There are a number of techniques for determining how to grasp objects, but most of these techniques are computationally complex because very large search spaces and/or brute force approaches are required. For example, deep learning methods are often used to train a robotic system and calculate success probabilities of prospective grasping strategies. Methods of identifying objects and corresponding optimal gasping strategies generally involve decomposing the object to one of a set of geometric primitive shapes (e.g., cylinders, squares, rectangles, etc.) and selecting a trained grasp, which may be referred to as an affordance-based approach. Moreover, this approach focuses primarily on the initial grasp and may not consider downstream tasks related to the target object.

A process knowledge database may be a repository of procedures and methods that may be generated with human input in order to richly describe how they do their jobs, and in turn teach and guide others to do jobs that they have little experience with. The process knowledge database details history of what has been done to a machine or object by showing evidence of what has transpired and link that closely with data points from IoT systems that may be integrated so that operators can view in real-time what different sensors are reading and compare to others. Over time a process knowledge database collects a rich history of how a job procedure changes depending on different situations and how individuals perform that job. These are areas that traditional systems may have very little data about how things work and what was done to systems because they depend on text data input by the operator.

Knowledge bases are the result of performing cognitive engineering to extract human knowledge utilizing at least one cyber-physical system (CPS), organizing the knowledge into a digital twin graph (DTG), and performing one or more machine learning techniques on the DTG to generate an engineering option to a user in at least one user tool. The method may involve recording a plurality of user actions in the user tool, and storing the actions in chronological order along with meta-process data.

A robotic process knowledge base may utilize a cloud computing system and/or on premise computing system to collect data from distributed robotic operations that compares the robotic automation strategy offered by the system with the resultant process-steps ultimately utilized to complete a task to offer knowledge base enhancements that can be utilized the next time the system encounters a similar use-case or scenario profile. A cloud computing system and/or on premise computing system may generally refer to computing services that are provided as a remote computing service or "software as a service." For example, such computing services may be provided by one or more datacenters that house computer systems and various networking, storage, and other related components. In some cloud computing systems and/or on premise computing systems, virtualization technologies may be implemented that allow a physical computing device to host one or more virtual machines (VMs) that appear and operate as independent computer devices to a connected user.

Haptic virtual fixtures are software-generated force and position signals applied to human operators via robotic devices. Virtual fixtures help humans perform robot-assisted manipulation tasks by limiting movement into restricted regions and/or influencing movement along desired paths.

Figure 1B:
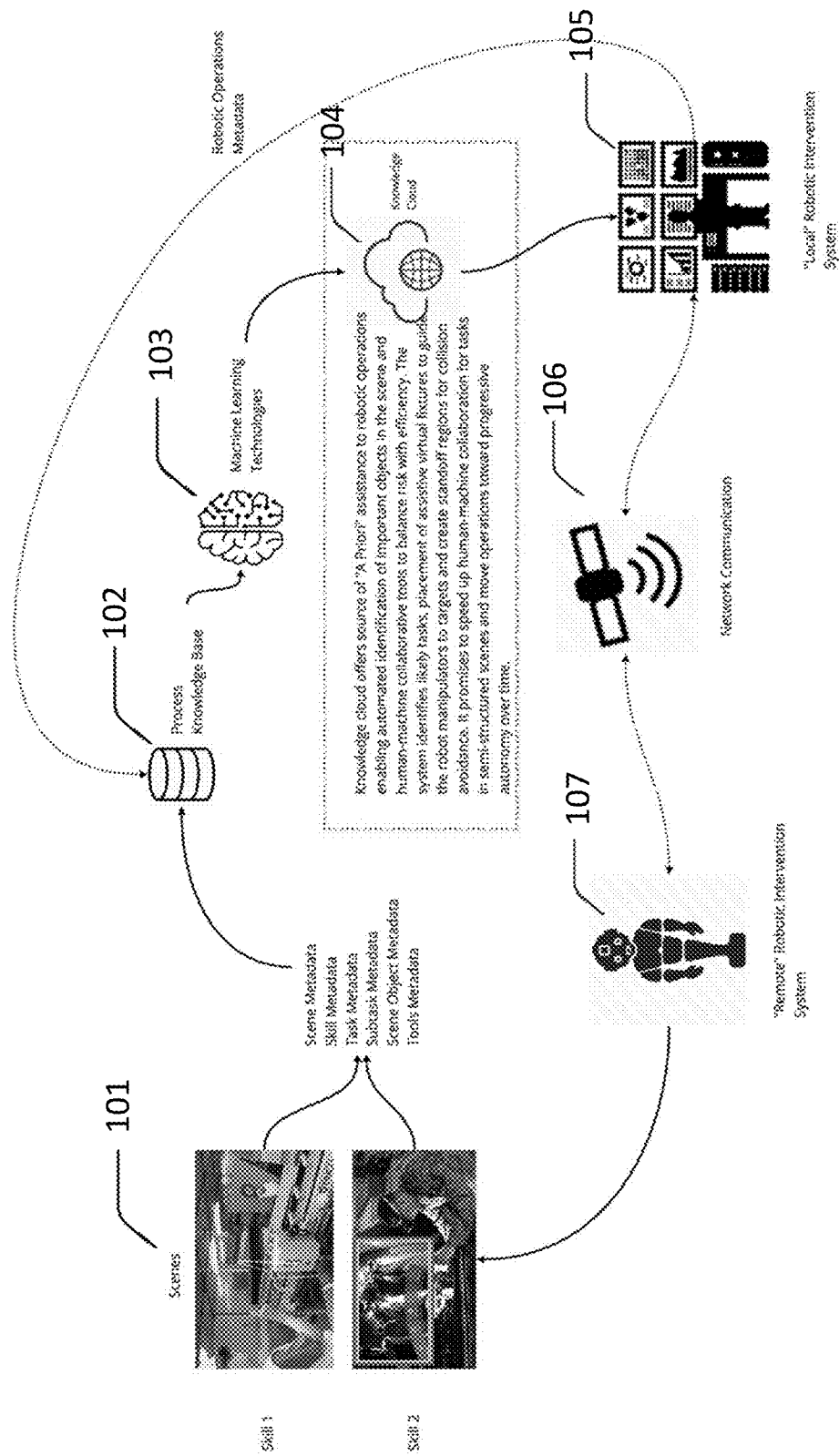
FIG. 1B is a diagram showing aspects of a system according to one embodiment disclosed herein.
Figure 1C:
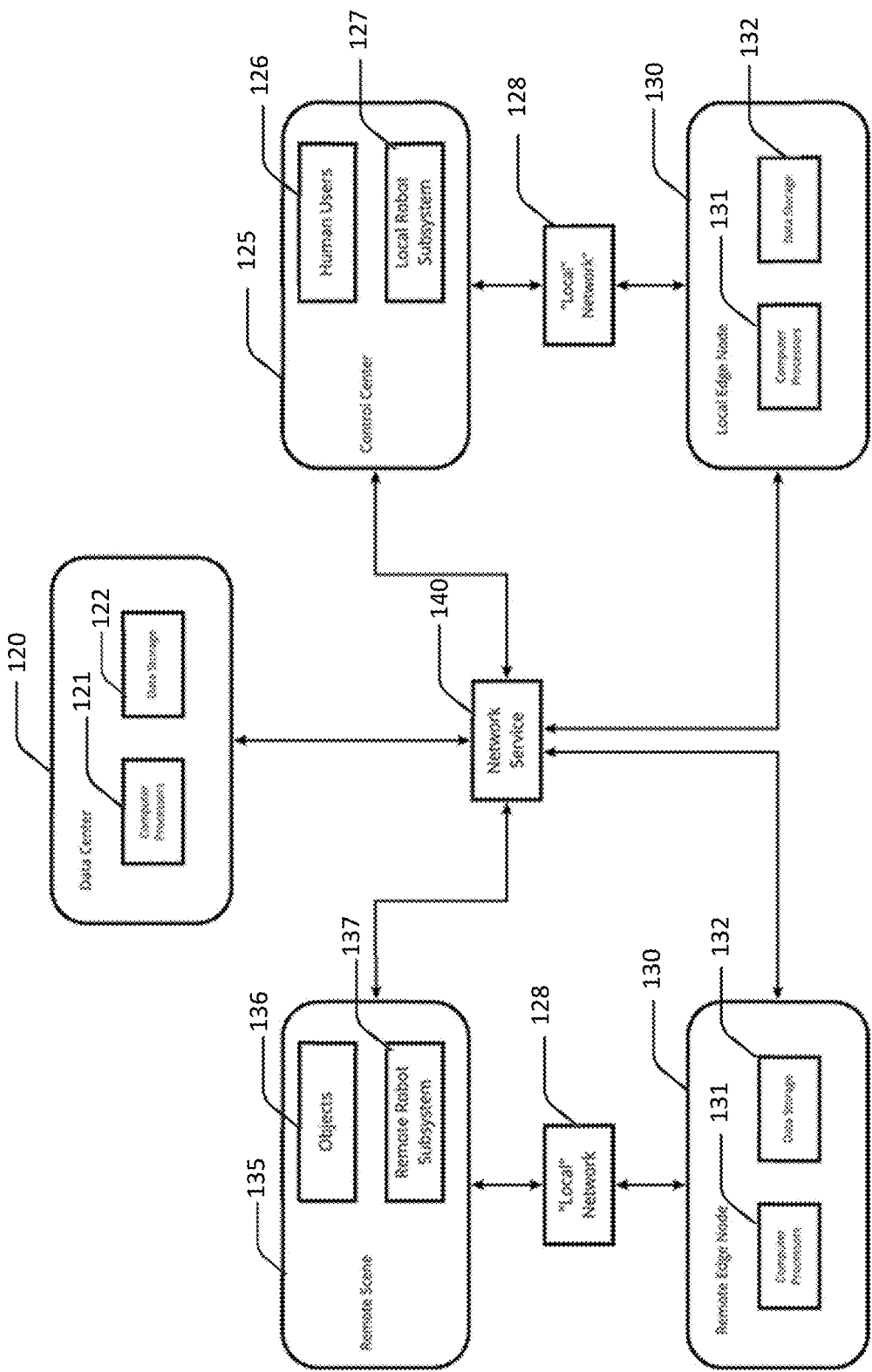
FIG. 1C is a diagram showing aspects of a system according to one embodiment disclosed herein.

FIG. 1C illustrates major system elements for embodiments illustrated herein.

Figure 2:
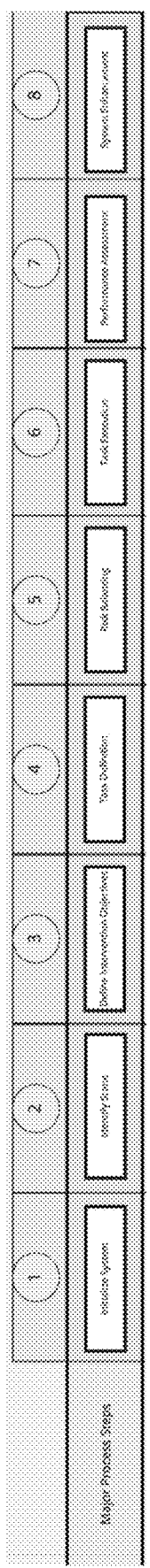
FIG. 2 is a diagram showing process steps of a system according to one embodiment disclosed herein.

FIG. 2: illustrates major process steps for an example robotic intervention system.

Figure 3A:
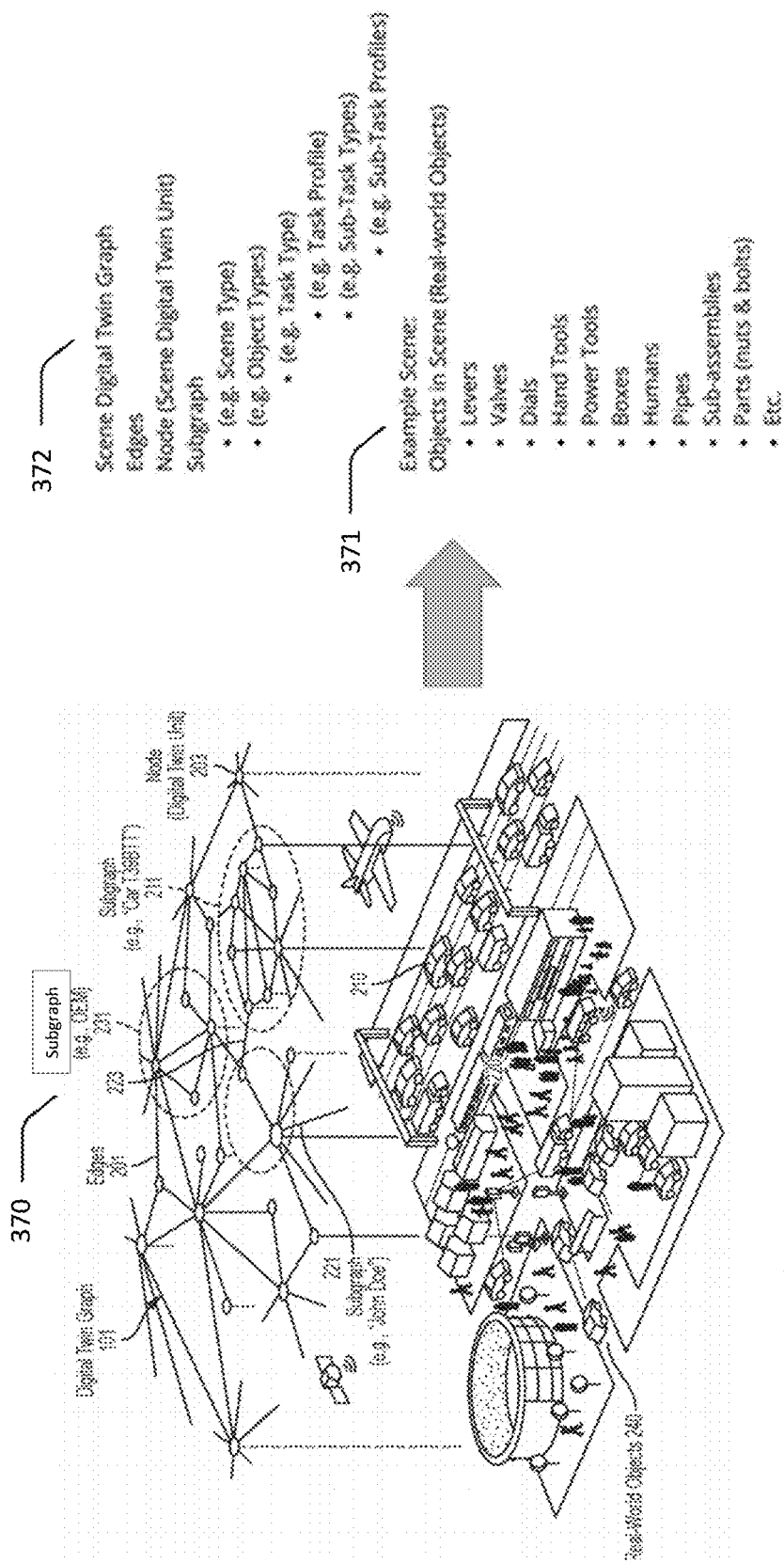
FIG. 3A is a diagram showing aspects of a system according to one embodiment disclosed herein.

FIG. 3A illustrates an example of a scene-task knowledge database comprising of a plurality of inter-related graphs.

Figure 4A:
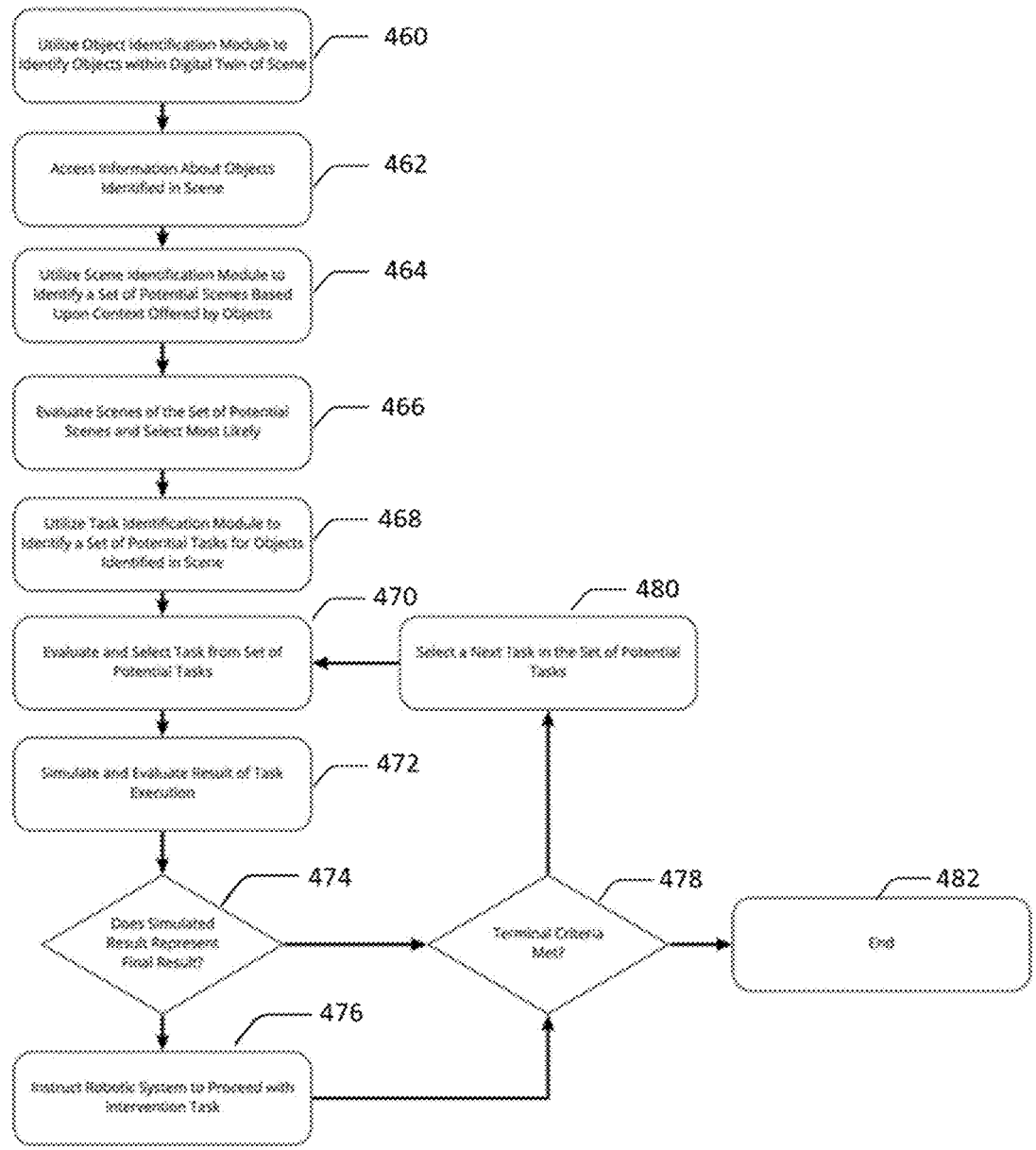
FIG. 4A is a diagram illustrating a process according to one embodiment disclosed herein.

FIG. 4A illustrates an example process flow for identifying subset of likely scenes.

Figure 5:
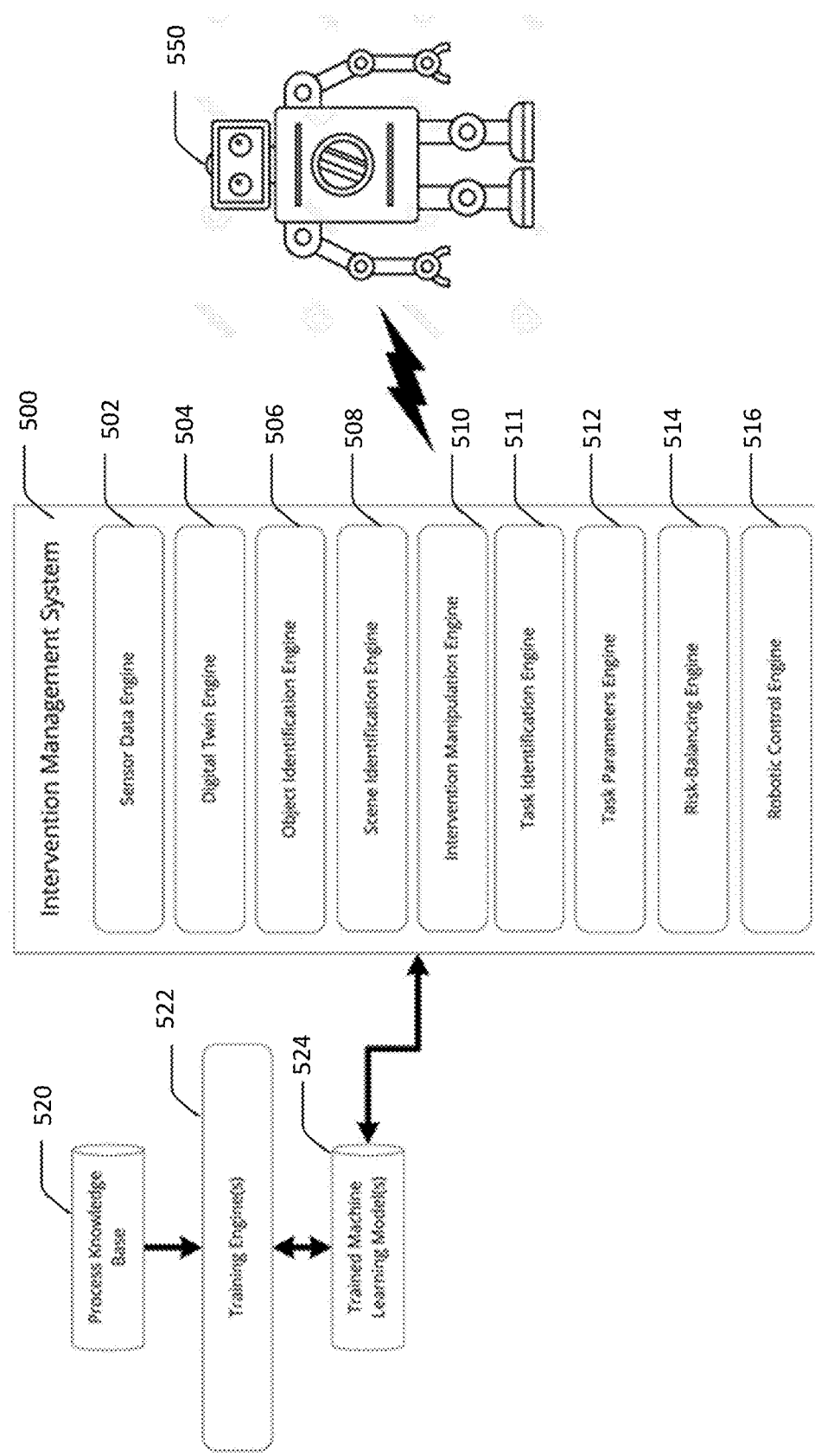
FIG. 5 is a diagram showing aspects of a system according to one embodiment disclosed herein.

FIG. 5 illustrates an example robotic intervention management system.

Figure 6:
FIG. 6 is a diagram illustrating a process according to one embodiment disclosed herein.

FIG. 6 illustrates an example process for generating human-machine-based control commands to a robotic system based on sensor data from the scene and several trained machine learning models from process knowledge base.

Figure 7A:
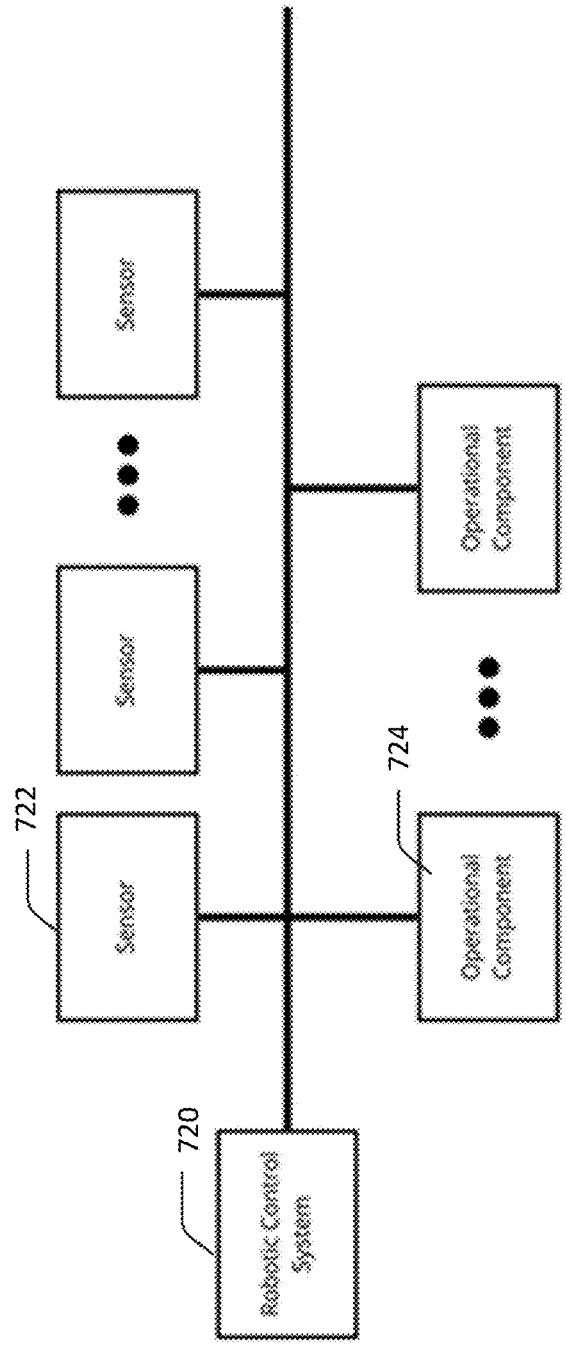
FIG. 7A is a diagram showing aspects of a system according to one embodiment disclosed herein.

FIG. 7A illustrates a schematic depiction of an example architecture of a remote robotic subsystem.

Figure 8A:
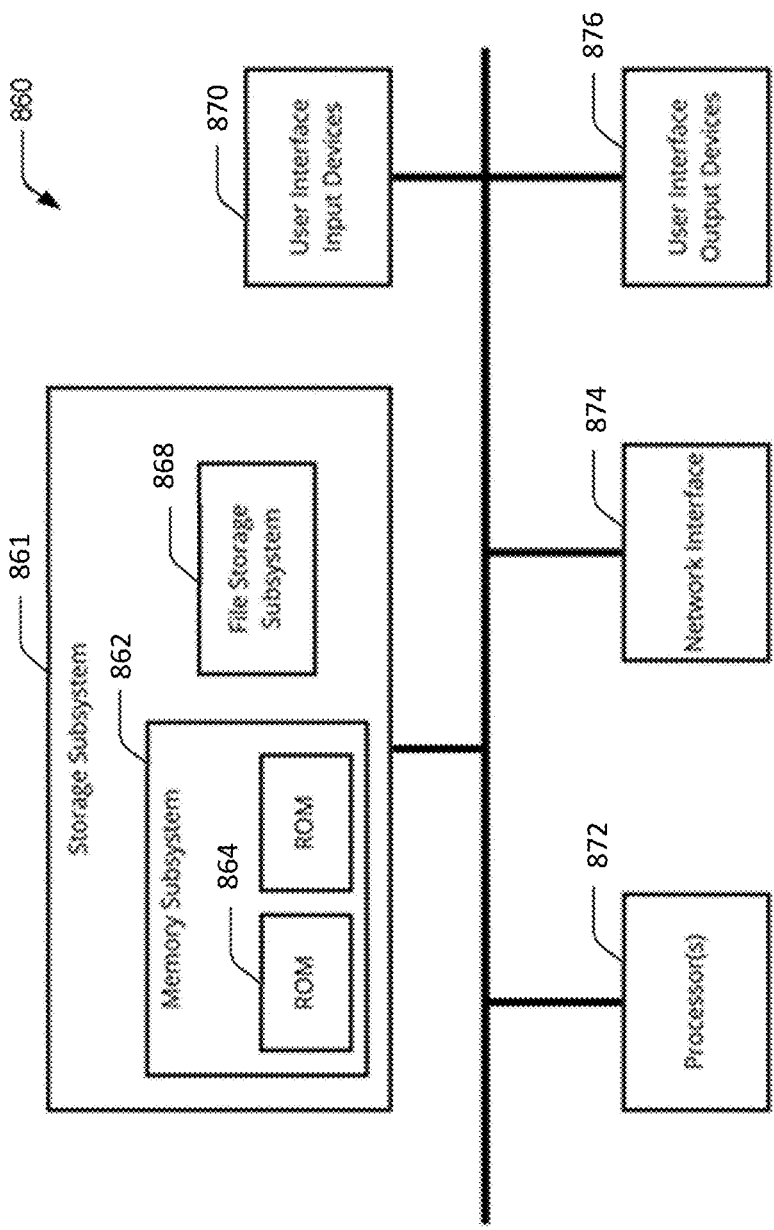
FIG. 8A is a computer architecture diagram illustrating aspects of an example computer architecture for a computer capable of executing the software components described herein.

FIG. 8A illustrates an example schematic depiction of local robotic subsystem.

Figure 9:
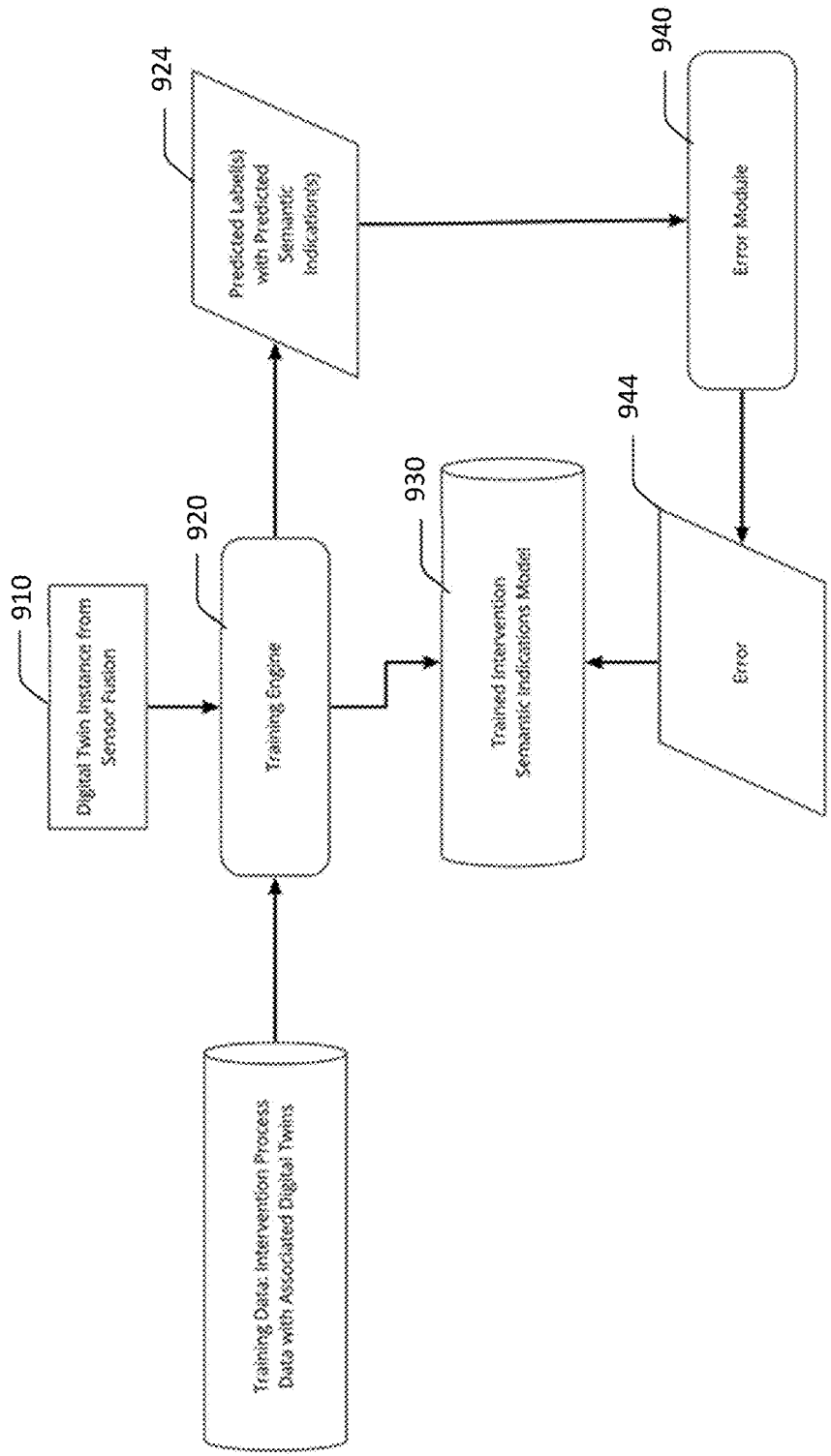
FIG. 9 is a flow diagram showing an illustrative routine, according to one embodiment disclosed herein.

FIG. 9 is an example process for training the robotic intervention semantic indications model.

With reference to the figures described herein, systems and methods are further described that utilize a process knowledge database to generate contextual and semantic labels to enable on-the-fly collaborative human-machine controlled robotic intervention systems that utilize variable levels of autonomy to execute tasks safely and efficiently.

Traditionally, robotic intervention systems operate autonomously or semi-autonomously (e.g., supervised) by using motion planning algorithms that utilize a machine learning produced knowledge database to understand a scene and propose alternative motion plans based on semantic information contained therein. This robotic control method has demonstrated to be useful in use-case scenarios involving structured environments such as within factories and warehouses. Nevertheless, this traditional method may be prone to intermittent failures in less controlled environments. Dexterous and deft robotic operations outside factories and warehouses is the domain commonly referred to as service robotics, which promises to offer solutions to reduce occupational and health hazards to humans by utilizing robots to execute tasks in these scenarios.

Failure of autonomous or semi-autonomous robotic intervention systems in service robot scenarios requires direct human assistance to help the robot proceed with its task, either physically or teleoperated. The robot can "get stuck," for example, when it runs into a contextual scenario that it was not trained for or the training falls short (perhaps due to different lighting conditions, a missing contextual feature, etc.). Failures of this nature can disrupt the flow of an overall operation that depends on systemic collaboration of robotic systems in order to be successful.

Variable autonomy is a control system approach that enables augmented control to balance operational efficiency with inherent risks by allowing a human-machine collaboration to execute an overall task (e.g., flipping a switch) by dividing sub-tasks (e.g., deciding which way to flip, how fast to flip, how to approach the switch, etc.) between the human and machine. The techniques described herein offer a way to progressively reduce the ratio of sub-tasks control by the human over time as a path to full autonomy for human-machine collaborative controlled robotic intervention system tasks.

Robotics technology has historically been utilized to automate dull, dangerous, and dirty tasks within very defined and controllable environments such as factories and warehouses. Recent service robotic applications (e.g., outside well-defined environments) have been made possible with performance and economic advances in sensor technology, machine learning, and computational capabilities. In order for service robots to support commercial operations, they will need to demonstrate that they can deftly execute tasks requiring dexterity, which is a major challenge for fully autonomous robotic systems (those where humans are not within or on the control loop) that need to be able to complete tasks in environments that may sometimes be only semi-structured or dynamic such as inside/outside industrial facilities, spaces shared with humans, or to conduct one-off intervention tasks. Machine intelligence for intervention tasks requires at least some of the objects within the scene exhibit structure so that they can utilize trained models. Examples of dexterous and deft robotic operations are one-piece-flow assembly/disassembly; industrial facility operations, shutdowns, and malfunctions operations; industrial processes with occupational health and safety hazard risks; and operations where robots are used in remote locations in place of humans as a way to reduce operational costs related to the logistics expenses such as transportation, care, and feeding of human workers.

Progressive assembly (disassembly), where parts, often interchangeable, are sequentially combined (separated) until a final semi-finished or final assembly (final disassembly) is produced. Assembly lines are common methods of assembling standardized complex items such as automobiles and other transportation equipment, and household appliances and electronic goods. Nevertheless, "one-piece-flow" assembly is often required because (disassembly) end-products are too small, large, or unique to warrant the investment required to create an assembly line process.

There are four significant periods that define an operational cycle for industrial facilities such as refineries, chemical plants, electrical plants, etc.: startup, steady-state, malfunction, and shutdown. Intervention within the system to flip switches, turn valves, levers, lock-out and/or secure position of system components may be required in any one of these periods.

An occupational health and safety hazard may be present any time there is a risk to the physical, mental, and/or social well-being of a worker. Risks may stem from interactions with a complex network related to chemicals, biological agents, physical factors, adverse ergonomic conditions, and/or allergens. Occupational hearing loss and falls are the most common work-related injury, especially in construction, extraction, transportation, healthcare, and building cleaning and maintenance. Machines have moving parts, sharp edges, hot surfaces and other hazards with the potential to crush, burn, cut, shear, stab or otherwise strike or wound workers if used unsafely.

Biological hazards (biohazards) include infectious microorganisms such as viruses and toxins produced by those organisms such as anthrax. Biohazards affect workers in many industries; influenza, for example, affects a broad population of workers.

Outdoor workers, including farmers, landscapers, and construction workers, risk exposure to numerous biohazards, including animal bites and stings and diseases transmitted through animals such as the West Nile virus and Lyme disease.

Health care workers, including veterinary health workers, risk exposure to blood-borne pathogens and various infectious diseases, especially those that are emerging.

Dangerous chemicals can pose a chemical hazard in the workplace. There are many classifications of hazardous chemicals, including neurotoxins, immune agents, dermatologic agents, carcinogens, reproductive toxins, systemic toxins, asthmagens, pneumoconiotic agents, and sensitizers.

Another application for robotic intervention systems is to support extreme remote work, work that is logistically expensive to be executed by humans due to transport, care and feeding. This work is typically in marine environments (above and below the water), in remote locations on land that lack infrastructure (e.g., at the poles, in deserts, the Amazon region, and certain regions of Africa), and in space.

Many systems today are not capable of addressing the issues noted herein due to one or more of:

Inability to utilize scene-based process knowledge while tele-operating a robot in run-time.
Inability to utilize scene-based process knowledge to provide virtual guidance and avoidance fixtures.
Inability to utilize scene-based process knowledge to enhance robotic path planning, selection, and visualization.
Inability to utilize scene-based process knowledge to enhance collaborative human-machine in run-time.
Inability to make on-the-fly adjustments to level of autonomy for risk balancing using scene-based process knowledge.
Inability to utilize scene-based process knowledge while training a virtual robot.

Control systems designed for variable autonomy may provide the added benefit of allowing humans to actively control the degree of autonomy on-the-fly during an operation based on the "pilot's" trust threshold with respect to the augmented control offered by the machine for a given task. Examples in practice of systems that allow humans to increase or decrease the level of augmented control provided by machines can be found by example of the modern automobile (e.g., speed control, park assist, lane assist, traffic assist, etc.).

FIG. 1A shows the theoretical impact of the degree of operational autonomy on overall cost of operations. On one side of the spectrum is fully human controlled machine (e.g., direct control of hydraulic backhoe) and on the other is a fully autonomous machine (e.g., a hydraulic backhoe controlled by a machine utilizing sensor data and control theory). Between the extremes is a region labeled augmented control (e.g., human controls some of the degrees of freedom and a machine control the remainder), where the ratio of the operation controlled directly by the human decreases from left to right. For simplicity, the cost curves over the degree of autonomy spectrum are summarized as those originating from human resources and those related to develop the various levels of autonomy.

One benefit of the present disclosure is the ability to introduce autonomy progressively as the technological capabilities mature. Indeed, a common problem encountered across service robotic development programs is the under forecast of the costs to fully automate an operation (e.g., self-driving cars, subsea intervention in the case of offshore energy, etc.).

The disclosed embodiments enable variable levels of autonomy for robotic systems for skillful execution of tasks. For example, automobiles do allow for variable autonomy via speed control, park assist, traffic assist, lane assist, etc., but in nearly all cases the human must recognize when these features are beneficial and must decide to engage and/or disengage the features. The systems reliance on the human to make these assessments can be a cognitive burden, especially as the number of assistive features increases. Not only does the human need to be able to recognize when a feature may actually be dangerous (e.g., lane assist while navigating through shifting lanes in a construction zone), but the human must also remember how to physically toggle the features on and off. The disclosed systems and methods can help reduce cognitive stress by offering intuitive ways to risk balance.

FIG. 1B provides a high-level view of aspects of an example of the present disclosure. Scenes 101 may be analyzed by a robot 107 that may be in communication 106 with a local system 105. The local system 105 may access the knowledge cloud 104 which may provide various interfaces to accessing information that may be based on machine learning technologies 103 that are applied to process knowledge database 102 that is populated with metadata based on scenes 101.

Figure 1D:
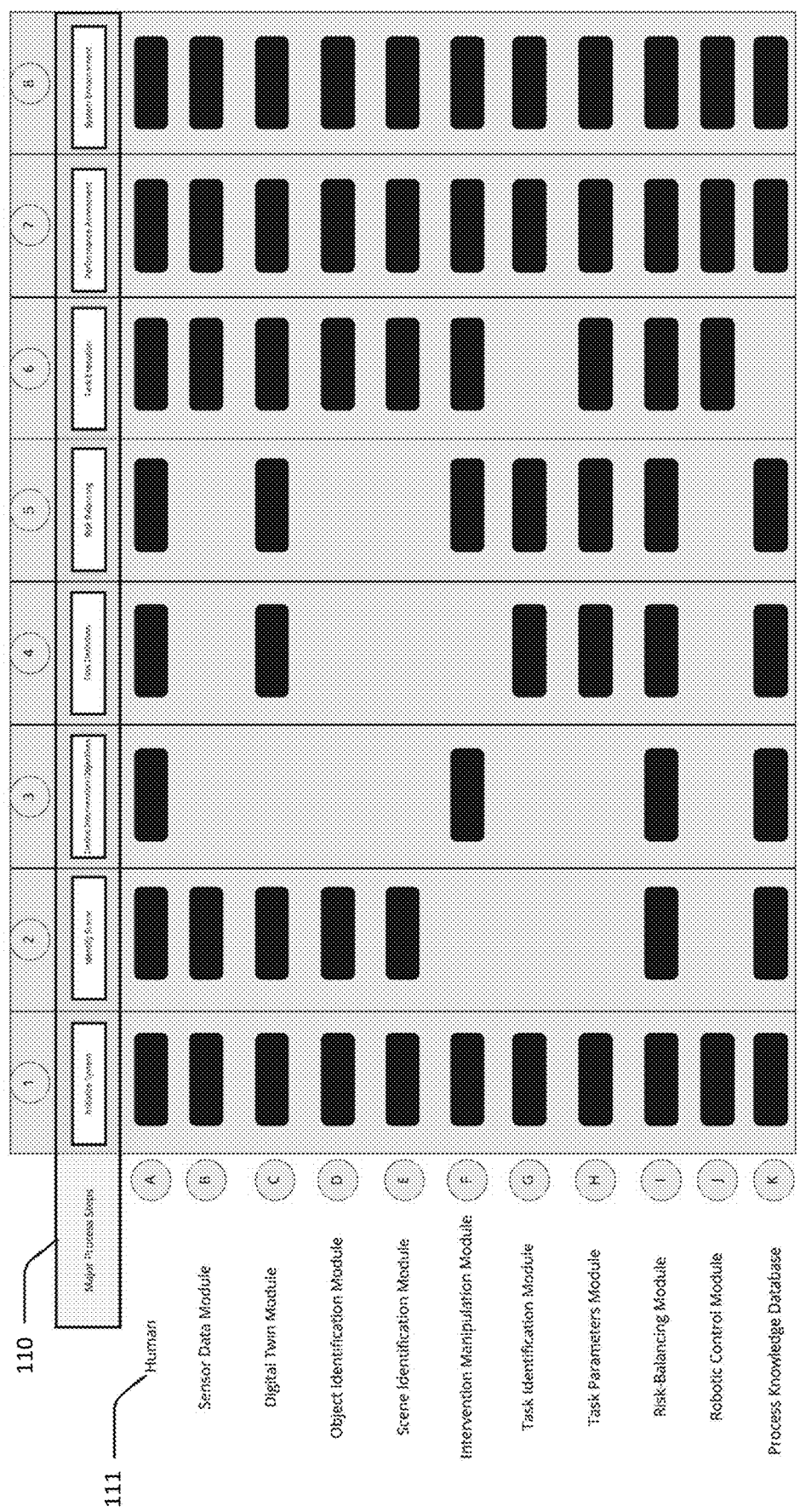
FIG. 1D is a diagram showing aspects of a system according to one embodiment disclosed herein.

Further detailed description is provided in a storyboard format, such as that illustrated in FIG. 1D. The storyboard shows the major process steps 110 across the top (numbered) and the major intervention system elements 111 listed on the left (labeled with a letter). The following sections indicate each system element's role by process step. A black box in FIG. 1B indicates that the system element is involved in or has a role in the process step.

Step 1: Initialize System

| Element | Brief Description of Element Role for Process Step |
|---|---|
| A | The human user may initialize the system as required to define operational objectives (perhaps to task level) and may be involved in identifying which metadatabase is relevant for the context. Depending on the autonomy level desired/possible, further calibrations may be necessary (including judgment of necessity) and may need to be organized by the human user. |
| B | The Sensor Data Module may power on and check the status of each sensor in the system. If any calibrations are needed, they may either be performed autonomously, or brought to the human users attention, depending on the level of autonomy selected. |
| C | Basic software initialization. |
| D | Basic software initialization; loading of trained models. |
| E | The scene identification module may load all available foreknowledge of the system configuration from the metadata database and the initialization of the digital twin and sensor data module. |
| F | Basic software initialization; loading of trained models. |
| G | Basic software initialization; loading of trained models. |
| H | Basic software initialization; loading of trained models. |
| I | The risk balancing module may initialize first, loading its trained model. This module is then involved in assisting the human user in autonomy decisions for the initialization of other subsystems (e.g. calibration approach for sensors). |
| J | Power-on the hardware available in the system, identify available assets, and load hardware configuration files. If calibrations are necessary, they may be performed autonomously or brought to the human user's attention, depending on the level of autonomy. |
| K | Basic software initialization. May involve selection of system context by human user. |

Step 2: Identify Scene

| Element | Brief Description of Element Role for Process Step |
|---|---|
| A | In a full autonomy application, the human user may monitor the output of the scene identification. For lower levels of autonomy, the human user may be relied upon to select and define boundaries and content of the scene including categorization of scene elements. |
| B | Data of the scene is collected and reported to the scene & object identification engines. |
| C | To the extent that the state and appearance of the robotic assets in the scene are identifiable by the sensor data, the digital twin assets may be updated to reflect the true state. Inputs may be reported by the object identification module. |
| D | Interactable objects, or objects of interest/relevance to the system may be recognized and reported to the scene identification and digital twin modules. The metadata database may be referenced in conjunction with the trained model. |
| E | The sensor data may be processed, and the context of the environment identified through the trained model and metadata database. The output of this module may include a populated virtual environment of the scene including contextual information which can be used to cross reference with a database of tasks and objectives. |
| F | |
| G | |
| H | |
| I | The risk balancing module may present the results of the scene identification to the human user, and assist the human user in deciding what level of human intervention may be required. |
| J | |
| K | The process metadata database may provide all foreknowledge of the scene (prior to human user inputs) to narrow the scope of the sensor data processing and contextualization of key objects. |

Step 3: Define Intervention Objectives

| Element | Brief Description of Element Role for Process Step |
|---|---|
| A | In a full autonomy application, the human user may monitor the output of the intervention objectives. For lower levels of autonomy, the human user may be relied upon to define up to the exact desired state of the scene in essentially the same way that the scene identification is performed. The intervention objectives may be defined in a virtual representation of the scene. |
| B | |
| C | |
| D | |
| E | |
| F | The intervention manipulation module may determine what the desired state of the scene is based on the current state of the scene, information from the metadata database, the trained intervention manipulation model, and any relevant human user instruction |
| G | |
| H | |
| I | The risk balancing module may present the results of the intervention manipulation module to the human user, and negotiate a feedback loop between the human user and intervention module if the human user determines manual inputs are necessary. |
| J | |
| K | The process metadata database may provide the intervention manipulation engine with predefined context to the scene to narrow the search for potentially desired scene states. |

Step 4: Task Definition

| Element | Brief Description of Element Role for Process Step |
|---|---|
| A | In a full autonomy application, the human user may monitor the output of the Task Definition; the user may have the opportunity to interrupt and walk through each task and manually compare the identified scene with the intervention objectives. For lower levels of autonomy the human user may be relied upon to define up to all of the tasks (e.g. virtual fixtures, set/refine way points, state sequences, motion constraints, etc.). |
| B | |
| C | In this phase, the digital twin module primarily serves as a tool for the human user to interface with the system to define tasks in a virtual environment. The digital twin module may also be utilized by the task identification module, depending on the specific software architecture. |
| D | |
| E | |
| F | |
| G | The task identification module takes the existing scene state and intervention objectives as inputs, and creates a sequences of tasks for the robotic system to realize the objectives. The digital twin may be utilized by this module as part of the process. |
| H | The task parameters module takes the task sequence from the task identification module as input, and identifies key variables of interest for each task. Based on the trained model, metadata database, and human user input, constraints or characteristics of interest for each task are defined. Examples include speed limits for cars, orientation of liquid containers, or duration that cold stowage is open. |

-continued

| Element | Brief Description of Element Role for Process Step |
|---|---|
| I | The risk balancing module may present the results of the task definition to the human user, and assist the human user in making any manual changes to the task pipeline and parameters as needed. |
| J | |
| K | The metadata database provides contextual information for tasks such as rules and requirements that are predetermined before initialization. |

Step 5: Risk Balancing

| Element | Brief Description of Element Role for Process Step |
|---|---|
| A | In this phase, the human user has the opportunity to define trust level of the system through the risk balancing module and determine the level of control the human user may have in the execution phase. |
| B | |
| C | In this phase, the digital twin module serves as a tool for the human user to walk through the task execution in simulation to evaluate the level of autonomy they are comfortable with. |
| D | |
| E | |
| F | In this phase, the risk balancing module and human user may filter or constrain the parameters of the intervention manipulation module. |
| G | In this phase, the risk balancing module and human user may filter or constrain the parameters of the task identification module. |
| H | In this phase, the risk balancing module and human user may filter or constrain the parameters of the task parameters module. |
| I | In this phase, the risk balancing module may provide the full pre-execution virtual scene and proposed task sequence to the human user to decide what the trust level of the system is and define what level of control the human user may have in the execution phase. Changes to the scene, intervention objectives, tasks and parameters may be negotiated between the respective modules here. |
| J | |
| K | The metadata database may provide identification of any human-defined constraints on autonomy level and risk appetite. This may include regulatory or company policy restrictions on autonomy for a given scene context (e.g. nuclear industry, product class, etc.). |

Step 6: Task Execution

| Element | Brief Description of Element Role for Process Step |
|---|---|
| A | Depending on the level of autonomy the human user may:<br>Full Manual: Control the motion of the robotic systems directly, with only kinematic calculations and telemetry display being performed by the system. The human user is in control of timing and sequence of operations, taking full responsibility for safety.<br>Augmented Control: The human user may interface with the system through a simplified interface with collision avoidance, safety functions, motion compensation, and task context switching executed collaboratively by the human-machine team. The human user may be in control of timing of operations, but not sequence, and may make judgment calls for safety at any point.<br>Semi-Autonomous: The tasks may be executed autonomously, but the human user may be responsible for choosing the task, starting the execution, and monitoring progress, with the ability to interrupt and step in to offer augmented control. |

-continued

| Element | Brief Description of Element Role for Process Step |
|---|---|
| | Fully-Autonomous: All tasks are executed under the assumption that human participation is not required. Human may monitor progress and interrupt. |
| B | The sensor data module may continuously monitor the environment and publish processed data to the scene identification, object identification, digital twin, and intervention manipulation modules. |
| C | The digital twin may be used to provide the human user the virtual control interface and display the state of the robotic assets during the course of the task execution. |
| D | Throughout the course of the execution, the object identification module may monitor incoming sensor data and track the state of all relevant objects. |
| E | Throughout the course of the execution, the scene identification module may monitor incoming sensor data and object identification module outputs to track the state of the scene. |
| F | Throughout the course of the execution, the intervention manipulation module may monitor the scene identification module and task module outputs to track success/completion of the operation. |
| G | |
| H | The task parameters module may take input from the object identification module to track the task parameters and constraints throughout the course of the execution. |
| I | The risk balancing module may monitor the execution of the tasks and support dynamic changes in autonomy level. This change in autonomy can be triggered either by human user inputs or in response to unplanned interference or safety situations with no autonomous mitigation in place. |
| J | The robotic control module converts meta data provided by intervention manipulation engine, task parameters engine and risk-balancing engine to hardware control signals and reports telemetry from the robotic system to the digital twin module. |
| K | |

Step 7: Performance Assessment

| Element | Brief Description of Element Role for Process Step |
|---|---|
| A | Depending on the level of autonomy the human user may either be inactive in this phase, or may judge the state of the scene in comparison to the intervention objectives. |
| B | The performance of the sensor data module may be assessed in this phase, and deficiencies in performance identified. |
| C | Any issues with the digital twin performance during the execution may be identified in this phase. |
| D | Any performance issues with the recognition of objects or their state may be identified in this phase. |
| E | Any performance issues with the scene recognition may be identified in this phase. |
| F | Any performance issues with the intervention tracking may be identified in this phase. |
| G | Any performance issues with the task generation may be identified in this phase. |
| H | Issues with the task parameterization may be identified in this phase. Additionally, the task parameters module may report any issues based on the performance of the execution in terms of the task parameters themselves. |
| I | The risk balancing module may be evaluated for its performance in this phase. |
| J | In this phase, any hardware performance issues during execution may be identified, either from the human user or from the task parameterization module. |
| K | The process metadata database may be used as an assessment reference in this phase. Additionally, the database itself may be evaluated for completeness, and any deficiencies in the data that was available for the operation identified here. |

Step 8: System Enhancement

| Element | Brief Description of Element Role for Process Step |
|---|---|
| A | Depending on the level of autonomy the human user may either be inactive in this phase, or may define improvements to the tasks, robotic control parameters, digital twin behavior, object identification, scene identification, or metadata database. These corrections, if performed manually by the human user, may serve as training inputs to the respective machine learning models. |
| B | Any improvements needed in either the data processing approaches, resources, or in the sensors themselves may be established in this phase. |
| C | Improvements needed to the digital twin may be identified in this phase. |
| D | Improvements to the object identification module may be made here, including accepting human user feedback as training inputs to improve module performance in future runs. Post-training performance can be checked by re-running the module over historic sensor data from the run that had performance issues previously. |
| E | Improvements to the scene identification module may be made here, including accepting human user feedback as training inputs to improve module performance in future runs. Post-training performance can be checked by re-running the module over historic sensor data from the run that had performance issues previously. |
| F | Improvements to either the mid-execution intervention tracking, or to the initially identified goal state may be made here, including accepting human user feedback as training inputs to improve module performance in future runs. Post-training performance can be checked by re-running the module over historic sensor data which resulted in performance issues previously. |
| G | Improvements to the task definition that are made by the human user may be fed into the task identification model as training inputs to improve the system. |
| H | Issues with the task parameters can be improved (changes to data types of tracking variables, adding additional parameters) in this phase and fed into the task parameterization model as training inputs. Additionally, this module can report performance issues to the robotic control module based on parameter data to train the control module to improve robot system performance in the future. |
| I | Improvements to the risk balancing module may be made here, including accepting human user feedback as training inputs to improve module performance in future runs. |
| J | Input from the performance assessment may be used to retune the system or upgrades to hardware may be performed in this phase. |
| K | The database may be supplemented with any additional information or existing information edited for improvements in this phase. As relevant the database may also be used as reference for enhancements made in other subsystems. |

FIG. 1C illustrates major system elements for embodiments illustrated herein. FIG. 1C illustrates data center 120 comprising computer processors 121 and data storage 122. Data center 120 may be in communication via network service 140 to control center 125, local edge notes 130, and remote scene 135. Remote scene 135 may include objects 136 and a remote robot subsystem 137, and may be in communication with remote edge 130 via local network 128. Remote edge 130 may include processors 131 and data storage 132. Control center 125 may include users 126 and local robot subsystem 127, and may be in communication with local edge 130 via local network 128.

FIG. 2: illustrates the major process steps for an example robotic intervention system, corresponding to the major process steps 110 of FIG. 1D.

FIG. 3A illustrates an example of a scene-task knowledge database comprising a plurality of inter-related graphs. An example scene 370 may be analyzed to identify objects 371 and determine digital twin 372 include edges, subgraphs, scene types, object types, task types, subtask types, task profiles, subtask profiles, and the like.

FIG. 4A illustrates an example process flow for identifying subset of likely scenes. In operation 460, an object identification module may be utilized to identify objects within a digital twin of a scene. In operation 462, information may be accessed about objects identified in the scene. In operation 464, a scene identification module may be utilized to identify a set of potential scenes based on the context of the objects. In operation 466, scenes of the set of potential scenes may be evaluated and the most likely scene may be selected. In operation 468, a task identification module may be utilized to identify a set of potential tasks for objects identified in the selected scene. In operation 470, the potential tasks may be evaluated, and a task may be selected. In operation 472, the result of the task execution may be simulated and evaluated. In operation 474, it is evaluated if the simulated result represents the final result. If the simulated result represents the final result, then in operation 476 the robotic system may be instructed to proceed with the intervention task. If the simulated result does not represent the final result, or after completion of operation 476, then in operation 478 it is determined if termination criteria have been met. If termination criteria have been met, then in operation 482 the process ends. If termination criteria have not been met, then in operation 480 a next task in the set of potential tasks is selected and may be followed by operation 470.

FIG. 5 illustrates an example robotic intervention management system 500. The robotic intervention management system 500 may include sensor data engine 502, digital twin engine 504, object identification engine 506, scene identification engine 508, intervention manipulation engine 510, task identification engine 511, task parameters engine 512, risk balancing engine 514, and robotic control engine 516. The robotic intervention management system 500 may communicate with a trained machine learning model 524 that operates with training engine 522 and process knowledge base 520. The robotic intervention management system 500 may communicate with a robotic device 550.

FIG. 6 illustrates an example process for generating human-machine-based control commands to a robotic system based on sensor data from the scene and several trained machine learning models from process knowledge base. FIG. 6 illustrates engines as shown in FIG. 5, and further illustrates scene and object metadata 602, intervention and semantic indications 603, intervention manipulation metadata 608, prospective task metadata 604, task metadata 620, and control commands 610. FIG. 6 also illustrates trained intervention semantic indications model 611, trained object identification model 601, trained scene scenario indications model 605, trained semantic indications model for scene-based task generation 606, trained semantic indications model for task parameterization 607, and trained semantic indications model for risk balancing 607.

FIG. 7A illustrates a schematic depiction of an example architecture of a remote robotic subsystem. A robotic control system 720 may be in communication with sensors 722 and operational components 724.

FIG. 8A illustrates an example schematic depiction of a local robotic subsystem 860. The local robotic subsystem 860 may include storage subsystem 861 which may include memory subsystem 862 having ROM 864. The storage subsystem 861 may also include file storage subsystem 868. The local robotic subsystem 860 may include processors 872, network interface 874, user interface output devices 876, and user interface input devices 870.

FIG. 9 is an example process for training the robotic intervention semantic indications model. Training engine 920 may receive or access a digital twin instance from sensor fusion 910 and training data including intervention process data with associated digital twins 922. The training engine 920 may cause generation of a trained intervention semantic indications model 930. The training engine 920 may provide predicted labels with predicted semantic indicators 924. The predicted labels may be provided to error module 940 which may determine an error 944. The error 944 may be fed back to the trained intervention semantic indications model 930.

Figure 3B:
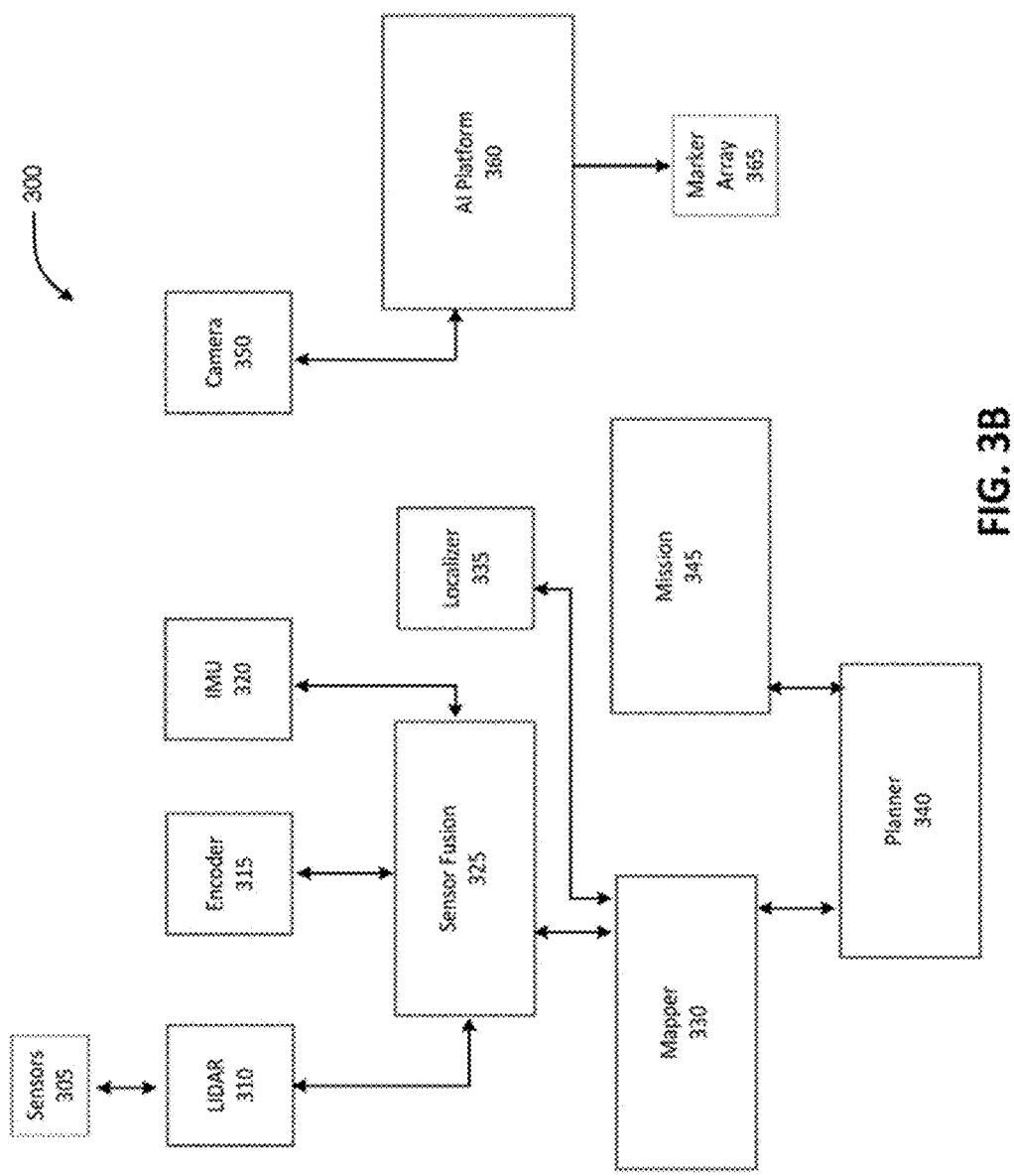
FIG. 3B is a diagram showing aspects of a system according to one embodiment disclosed herein.

FIG. 3B illustrates an example robot model 300 including a robot operating system (ROS). A robot is typically configured to receive multiple inputs simultaneously and asynchronously. For example, multiple sensors and devices may be generating data that is processed. Referring to FIG. 3B, the robot build model 300 may be configured to receive sensor inputs from one or more sensors 305. The robot build model 300 may further be configured to receive inputs from a Light Detection and Ranging (LIDAR) 310 which uses pulsed laser to measure distance. Other inputs may be provided by an encoder 315 and an inertial measurement unit (IMU) 320. The various sensor inputs may be processed to provide navigation and localization for the robot.

In an embodiment, the sensor information may be processed by a sensor fusion function 325. A mapper 330 may be configured to generate a map of the robot's surroundings. A localizer 335 may be configured for the robot to localize itself in the map. A planner 340 may be configured to generate a sequence of actions that allows the robot to complete a mission 345, such as moving from a first point to a second point.

In an embodiment, a camera handler 350 may be implemented to process one or more camera inputs. An AI framework 360 that includes an inferencing function may be implemented to receive and process camera and other input and identify the environment and determine objects within the environment such as people, chairs, walls, doors, and the like. The position and orientation of the objects can be determined relative to a coordinate system, and the position and orientation may be referred to as the pose. The robot may use the pose to manipulate an object, avoid running into the object, etc. In some implementations, the pose may be published as a marker array 365 which indicates the position and orientation of an object as determined from the perspective of the robot. The planner 340 may, for example, create a plan to manipulate an object.

Figure 4B:
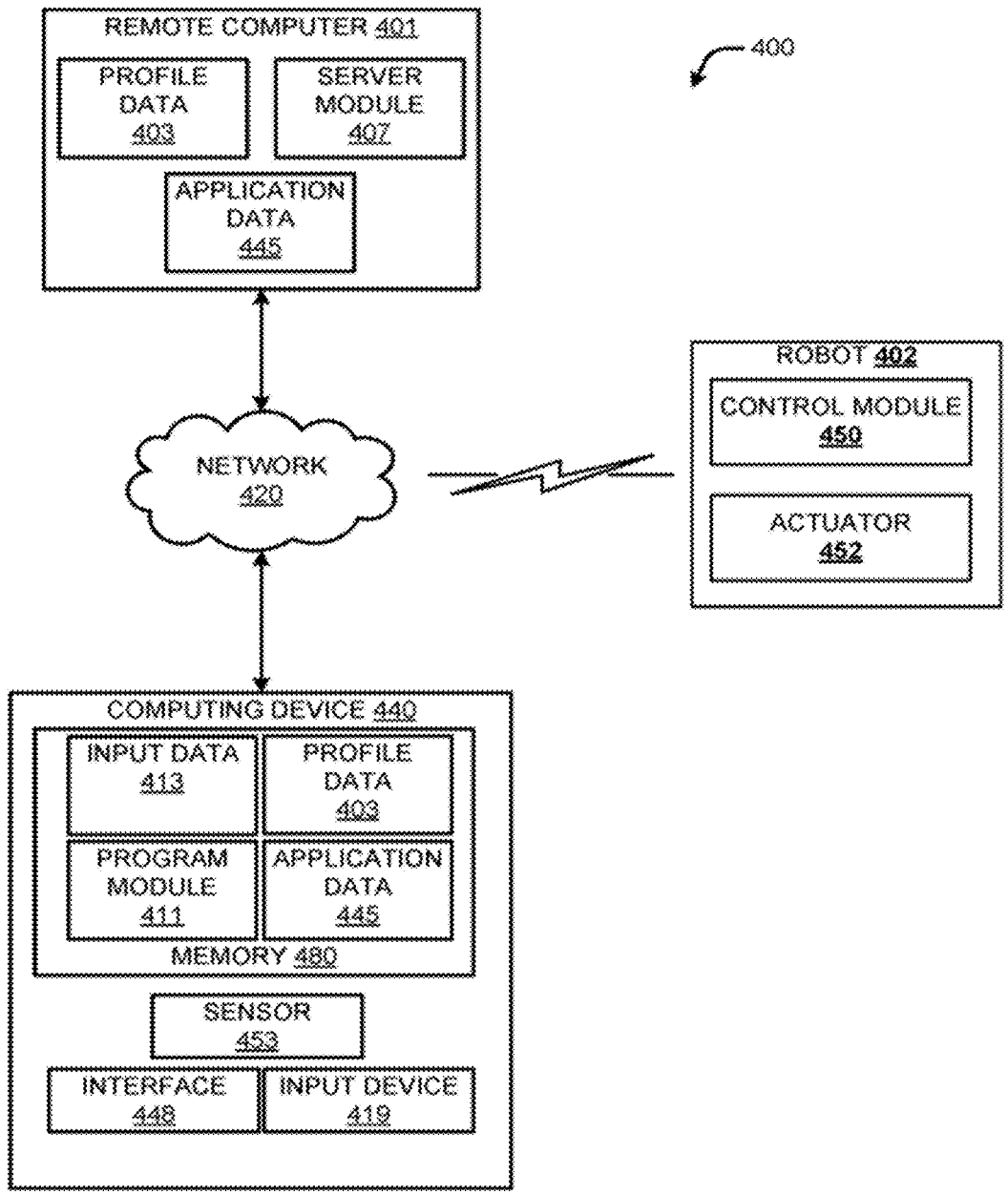
FIG. 4B is a diagram showing aspects of a system according to one embodiment disclosed herein.

FIG. 4B is a system diagram showing aspects of an illustrative system for providing aspects of the present disclosure. A system 400 may include a remote computer 401, a computing device 440, a robotic device 402, and a network 420. For illustrative purposes, the robotic device 402 is also referred to herein as a "robot 402" or a "second computing device 402." It should be understood that some or all of the functions and components associated with robotic device 402 and computing device 440 may be implemented on a single device or multiple devices.

The computing device 440 may operate as a stand-alone device, or the computing device 440 may operate in conjunction with other computers, such as the remote computer 401. As can be appreciated, the remote computer 401, the robot 402 and the computing device 440 are interconnected through one or more local and/or wide area networks, such as the network 420. In addition, the robot 402 may be in communication with the computing device 440 and other computers by the use of one or more components. For instance, the robot 402 may be equipped with one or more light sources, and the computing device 440 may include one or more sensors, including a camera, for detecting the location of the robot 402. The robot 402 may be configured with light sources, sensors and transmitting devices to facilitate communication with one or more devices. Other wired or wireless communication mechanisms may be utilized to provide communication between one or more components and/or devices shown in FIG. 4B and other components or computers. In some configurations, the robot 402 can also include an input device, a sensor, such as a camera, or other devices for generating image data or input data 413. Any data obtained or generated by the robot 402 can be communicated to another computer or device, such as the computing device 440 or remote computer 401. It should be appreciated that many more network connections may be utilized than illustrated in FIG. 4B.

The computing device 440 may be in the form of a personal computer, a wearable computer, including an HMD, or any other computing device having components for causing a display of one or more images on a display, such as an interface 448. In some configurations, the interface 448 may be configured to cover at least one eye of a user. In one illustrative example, the interface 448 may include a screen configured to cover both eyes of a user. The system 400 or aspects of the system 400 may generate one or more images for generating a stereoscopic view of one or more objects. The computing device 440 may comprise a sensor 453, such as a sonar sensor, a depth sensor, infrared sensor, heat sensor, touch sensor, or any other device or component for detecting the presence, position, and/or characteristics of an object. In addition, the computing device 440 can comprise an input device 419, such as a keyboard, mouse, microphone, or any other device configured to generate a signal and/or data based on any interaction with the computing device 440. For illustrative purposes, signals or data provided by a component, such as the sensor 453 or the input device 419 is referred to herein as input data 413. Input data 413 may also include contextual data or other data received from a computing system, such as the remote computer 401, or a server providing a resource or service.

The interface 448 may be configured to display multiple images from different environments. For example, some configurations of the interface 448 can allow a user to see through selectable sections of the interface 448 enabling the user to view his or her surroundings. As will be described in more detail below, content can be displayed around selected portions of the interface 448 enabling a user to see displayed content along with views of real-world objects observed through the selected portions of the interface 448.

The computing device 440 may include a local memory 480 that stores profile data 403, input data 413, and application data 445. The profile data 403 may store information describing user activity, preferences and other information used for providing control of one or more computing devices, such as a robot. The application data 445 may include output data generated by techniques disclosed herein.

The computing device 440 may also include a program module 411 configured to manage techniques described herein and interactions between a robot and the computing device 440. For example, the program module 411 may be configured with one or more surface reconstruction algorithms and other algorithms for locating objects and devices. The surface reconstruction algorithms and other algorithms may use data or signals collected from one or more sensors 453, such as a depth sensor attached to the computing device 440.

The remote computer 401 may be in the form of a server computer or a number of server computers configured to store and process the profile data 403, application data 445. The remote computer 401 may also include components, such as the server module 407.

The robot 402 may be equipped with a control module 450 for executing instructions communicated to the robot 402. The robot 402 may have one or more control components, such as an actuator 452. Components of the robot 402, such as the actuator 452, may be configured to generate a physical movement of one or more objects from instructions received by the robot 402. Robot 402 may also comprise a number of motors configured to control the movement of the robot 402.

In some aspects of the disclosure, the computing device 440 detects one or more conditions based on the input data 413 and other data and generates one or more instructions for controlling the robot 402. In some configurations, the computing device 440 obtains input data 413 and other data describing the location and status of the robot 402. In addition, the computing device 440 may obtain and process data indicating a location of the robot 402 relative to the computing device 440.

Any input data 413 received from any resource, such as a remote computer or a sensor, may be used by the computing device 440 to determine the location of any object, the location of the computing device 440 and the location of the robot 402. For instance, the computing device 440 or the robot 402 may include one or more sensors for obtaining depth map data, such as a depth sensor, and other data to identify the location of various objects in a room, including the room boundaries. Configurations disclosed herein can generate data describing geometric parameters of any object or boundary.

Any known technology for identifying the location of one or more objects may be used by the techniques disclosed herein. In one example, data defining the location of the robot 402 or a person may be obtained by the use of an optical sensor, such as a camera or any other sensor 453 or input device 419, and lights or other visual elements mounted on the robot 402. Any known technology, such as a technology utilizing triangulation techniques, may be used to identify a position and direction of the robot 402. In addition, other technologies can be used to determine a distance between the robot 402 and other objects.

These examples are provided for illustrative purposes only and are not to be construed as limiting. Any technology may be used for identifying a location of any computing device or object, which may involve the use of a radio signal, a light-based signal or any signal capable of identifying the location of an object. The computing device 440 may process any input data 413 from any device or resource to identify the location and other contextual information regarding objects or computing devices.

In some configurations, the robot 402 may have one or more sensors for capturing and generating data. In one illustrative example, the robot 402 may be equipped with one or more depth map cameras. The depth map cameras, or any other type of sensor, may collect data describing objects detected by the sensors. In yet another example, the robot 402 may be equipped with a wheel position sensor. Data or a signal generated by such sensors, such as the wheel position sensor, may be used to identify the location, velocity or other information regarding the robot 402. These examples are provided for illustrative purposes only and are not to be construed as limiting. It can be appreciated that a number of sensors or devices may be used to generate/obtain data associated with one or more objects and to identify the location of one or more objects.

The obtained data, such as depth map data, may be then processed by the techniques described herein to identify objects and the location of objects, and to generate and display data associated with the object. In the examples described herein, the data associated with the object is displayed on a user interface with a representation or graphical element that shows an association between the data associated with the object and an object. For illustrative purposes, data that is associated with an object is referred to herein as "attached data" or data that is "attached" to an object. In addition, any obtained data, also referred to herein as input data 413, may be used for generating and modifying instructions for one or more computing devices, e.g., a robot 402. In some configurations, robot 402 can be configured to perform or manage complex navigation and pathfinding tasks for the robot 402.

In some configurations, the computing device 440 interprets input data 413 and/or other data to determine a context with respect to the objects in the room. The computing device 440 may perform one or more functions, such as a depth map analysis and surface reconstruction analysis to identify objects and properties of objects. For instance, certain geometric shapes and other parameters, such as a size of an object, may be used to categorize or characterize individual objects, e.g., an object may be characterized as "furniture," a "high-priority object," or a "primary object." Other data related to objects in an environment may be obtained from databases or other resources.

In some configurations, the techniques disclosed herein may process input data 413 from one or more resources to generate contextual data. The contextual data can be used by techniques described herein to identify a location associated with each identified object. Based on location information, other data, and other properties associated with each object, the techniques disclosed herein can generate instructions for a robot to perform one or more tasks. The generated instructions may be based on the location of the identified objects, such as a computer, geometric data, characteristics of an object, and other contextual information.

Figure 7B:
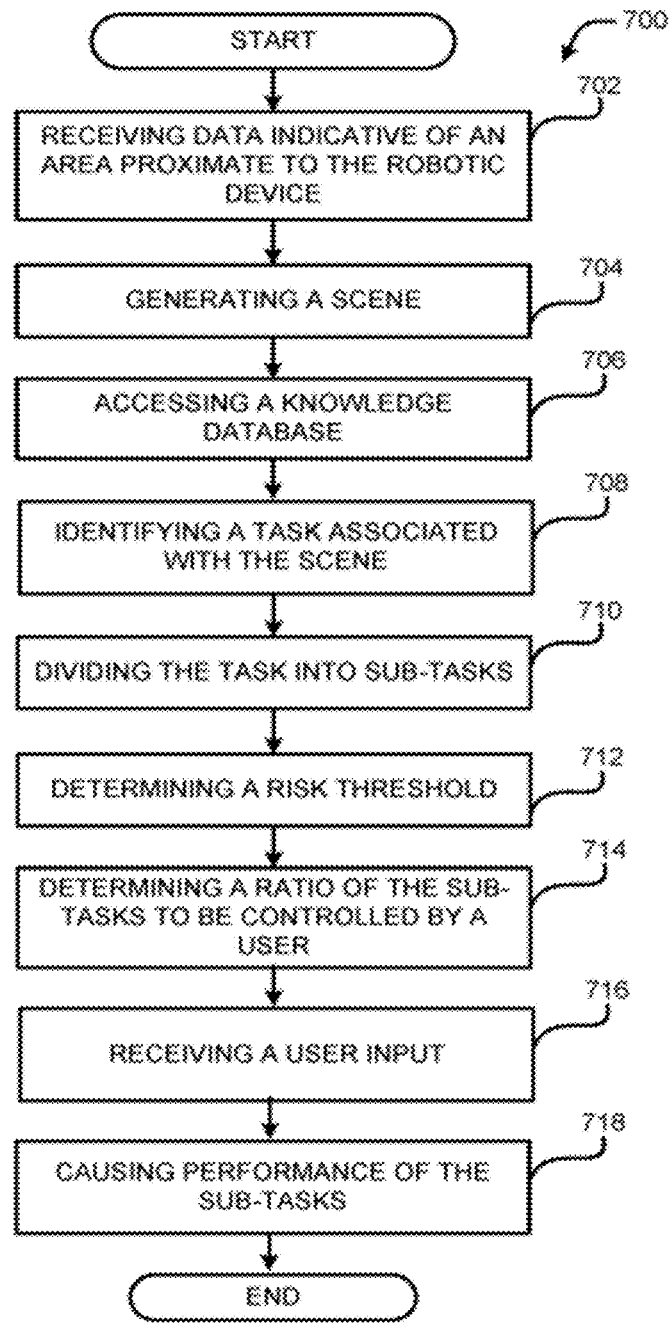
FIG. 7B is a flow diagram showing an illustrative routine, according to one embodiment disclosed herein.
Figure 7C:
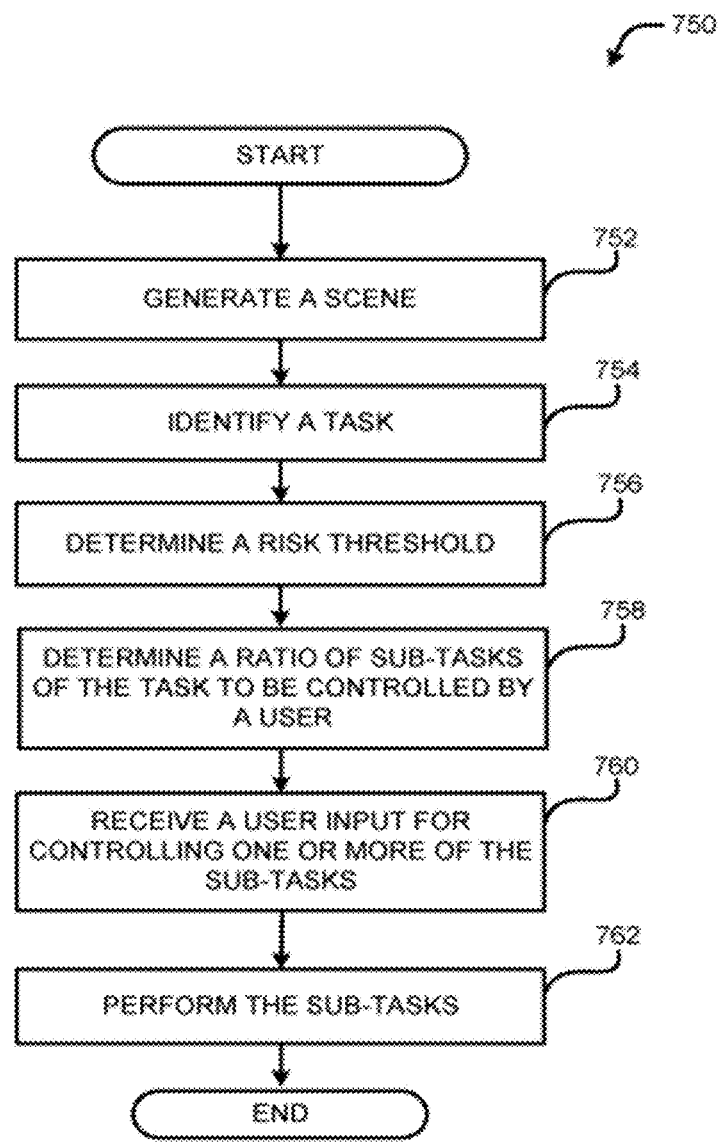
FIG. 7C is a flow diagram showing an illustrative routine, according to one embodiment disclosed herein.

Turning now to FIGS. 7B and 7C, aspects of a routine 700 and 750 are shown and described below. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in its entirety. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As will be described in conjunction with FIG. 8B, the operations of the routine 700 and 750 are described herein as being implemented, at least in part, by an application, component and/or circuit, such as the program module 811. Although the following illustration refers to the components of FIG. 8BB, it can be appreciated that the operations of the routines 700 and 750 may be also implemented in many other ways. For example, the routines 700 and 750 may be implemented, at least in part, by computer processor or processor of another computer. In addition, one or more of the operations of the routines 700 and 750 may alternatively or additionally be implemented, at least in part, by a chipset working alone or in conjunction with other software modules. Any service, circuit or application suitable for providing contextual data indicating the position or state of any device may be used in operations described herein.

Referring to FIG. 7B, the routine 700 begins at operation 702, where data indicative of an area proximate to the robotic device is received. Operation 704 illustrates based on the data, generating a scene. Operation 706 illustrates accessing a knowledge database having contextual and semantic labels for assisting the robotic device in executing tasks in context of one or more scenes. Operation 708 illustrates based on the knowledge database, identifying a task associated with the scene. Operation 710 illustrates dividing the task into sub-tasks. Operation 712 illustrates determining a risk threshold based on the scene, the sub-tasks, and one or more trust thresholds. Operation 714 illustrates based on the risk threshold, determining a ratio of the sub-tasks to be controlled by a user. Operation 716 illustrates in accordance with the risk threshold, receiving a user input for controlling one or more of the sub-tasks when the ratio dictates that at least one of the sub-tasks requires the user input. Operation 718 illustrates causing performance of the sub-tasks by the robotic device. In an embodiment, the ratio is progressively updated over time based on updates to the knowledge database and the risk threshold.

Referring to FIG. 7C, the routine 750 begins at operation 752, where based on data indicative of an area proximate to the autonomous device, a scene is generated. Operation 754 illustrates based on information from a knowledge database, identifying a task associated with the scene. In an embodiment, the knowledge database includes contextual and semantic labels for assisting the autonomous device in executing tasks in context of the scene. Operation 756 illustrates determining a risk threshold based on the scene, the task, and one or more trust thresholds. Operation 758 illustrates based on the risk threshold, determining a ratio of sub-tasks of the task to be controlled by a user. Operation 760 illustrates in accordance with the risk threshold, receiving a user input for controlling one or more of the sub-tasks when the ratio dictates that at least one of the sub-tasks requires user intervention. Operation 762 illustrates performing the sub-tasks.

Figure 8B:
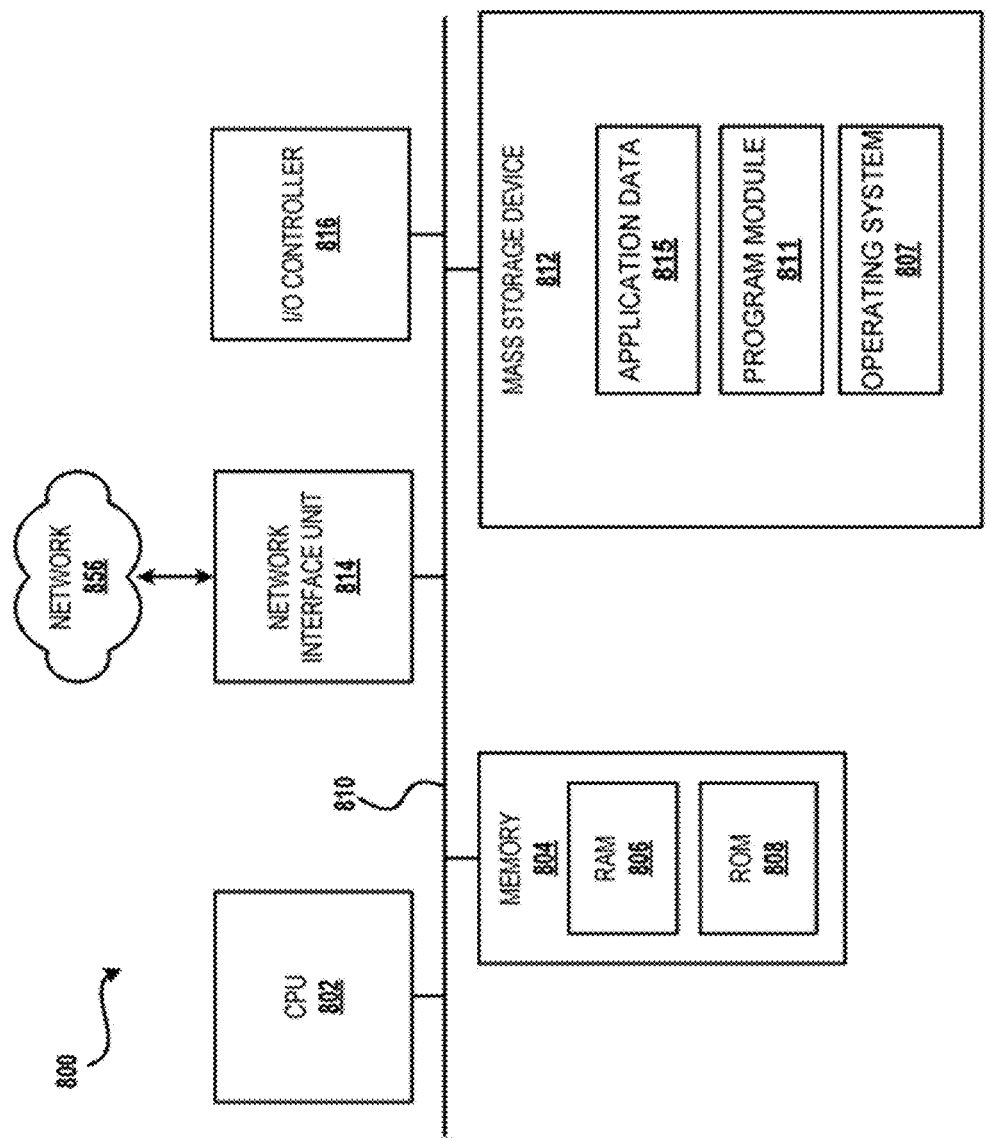
FIG. 8B is a computer architecture diagram illustrating aspects of an example computer architecture for a computer capable of executing the software components described herein.

FIG. 8B shows additional details of an example computer architecture 800 for a computer capable of executing the program components described above. The computer architecture 800 may be utilized to execute any aspects of the software components presented herein.

The computer architecture 800 illustrated in FIG. 8B includes a central processing unit 802 ("CPU"), a system memory 804, including a random access memory 806 ("RAM") and a read-only memory ("ROM") 808, and a system bus 810 that couples the memory 804 to the CPU 802. A basic input/output system containing the basic routines that help to transfer information between elements within the computer architecture 800, such as during startup, is stored in the ROM 808. The computer architecture 800 further includes a mass storage device 812 for storing an operating system 807, and one or more application programs including, but not limited to, a tracking module 105 and contextual data 801.

The mass storage device 812 is connected to the CPU 802 through a mass storage controller (not shown) connected to the bus 810. The mass storage device 812 and its associated computer-readable media provide non-volatile storage for the computer architecture 800. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computer architecture 800.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 800. For purposes the claims, the phrase "computer storage medium," "computer-readable storage medium" and variations thereof, does not include waves, signals, and/or other transitory and/or intangible communication media, per se.

According to various configurations, the computer architecture 800 may operate in a networked environment using logical connections to remote computers through the network 856 and/or another network (not shown). The computer architecture 800 may connect to the network 856 through a network interface unit 814 connected to the bus 810. It should be appreciated that the network interface unit

814 also may be utilized to connect to other types of networks and remote computer systems. The computer architecture 800 also may include an input/output controller 816 for receiving and processing input from a number of other devices, including a keyboard, mouse, or electronic stylus (not shown in FIG. 8B). Similarly, the input/output controller 816 may provide output to a display screen, a printer, or other type of output device (also not shown in FIG. 8B).

It should be appreciated that the software components described herein may, when loaded into the CPU 802 and executed, transform the CPU 802 and the overall computer architecture 800 from a general-purpose computing system into a special-purpose computing system customized to facilitate the functionality presented herein. The CPU 802 may be constructed from any number of transistors or other discrete circuit elements, which may individually or collectively assume any number of states. More specifically, the CPU 802 may operate as a finite-state machine, in response to executable instructions contained within the software modules disclosed herein. These computer-executable instructions may transform the CPU 802 by specifying how the CPU 802 transitions between states, thereby transforming the transistors or other discrete hardware elements constituting the CPU 802.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 800 in order to store and execute the software components presented herein. It also should be appreciated that the computer architecture 800 may include other types of computing devices, including hand-held computers, embedded computer systems, personal digital assistants, and other types of computing devices known to those skilled in the art. It is also contemplated that the computer architecture 800 may not include all of the components shown in FIG. 8B, may include other components that are not explicitly shown in FIG. 8B, or may utilize an architecture completely different than that shown in FIG. 8B.

Figure 10:
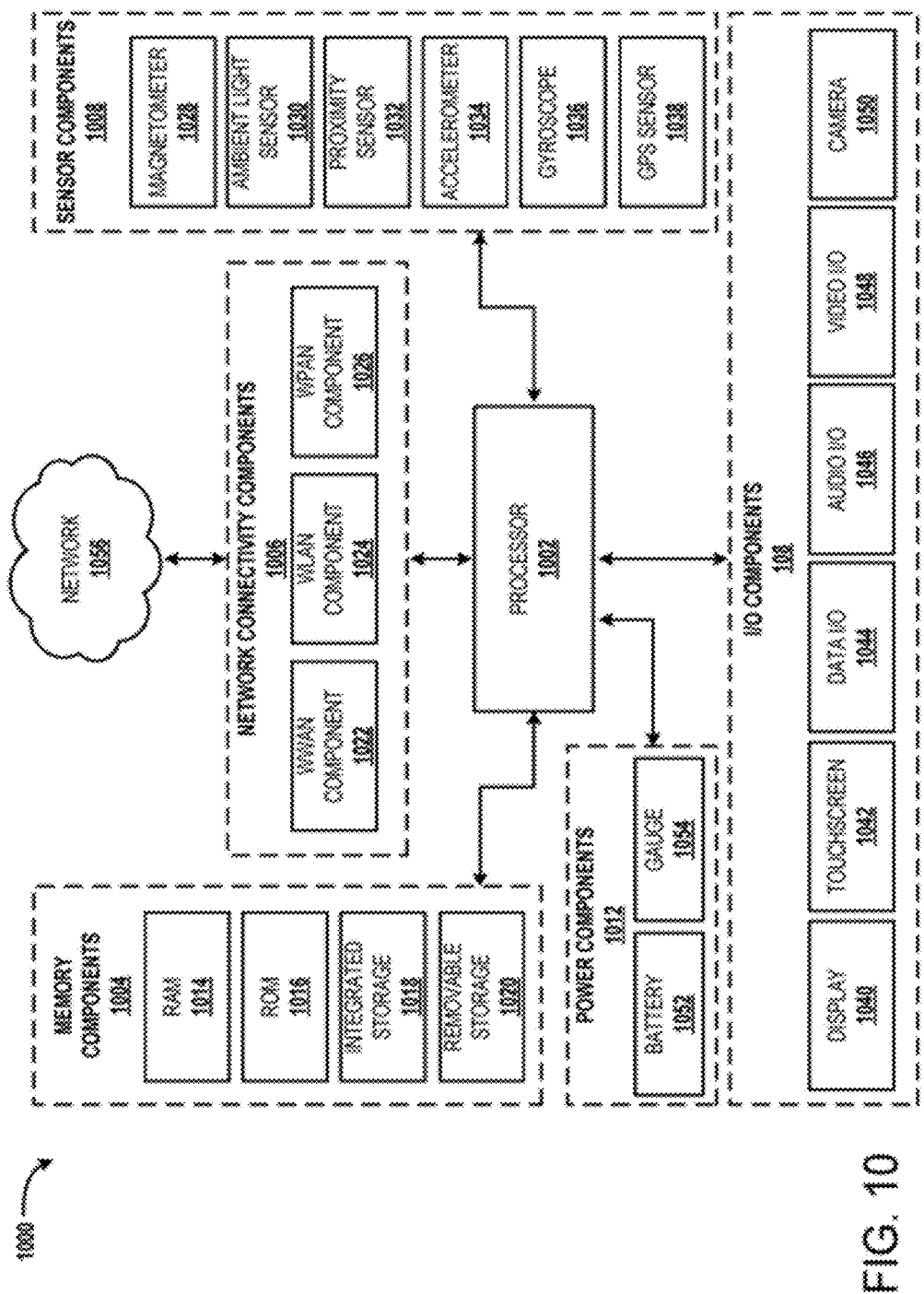
FIG. 10 is a computer architecture diagram illustrating aspects of an example computer architecture for a system according to one embodiment disclosed herein.

Turning now to FIG. 10, an illustrative computing device architecture 1000 for a computing device that is capable of executing various software components described herein. The computing device architecture 1000 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like. The computing device architecture 1000 is applicable to any of the clients 806 shown in FIG. 8B. Moreover, aspects of the computing device architecture 1000 may be applicable to traditional desktop computers, portable computers (e.g., laptops, notebooks, ultra-portables, and netbooks), server computers, and other computer systems, such as those described herein. For example, the single touch and multi-touch aspects disclosed herein below may be applied to desktop computers that utilize a touchscreen or some other touch-enabled device, such as a touch-enabled track pad or touch-enabled mouse.

The computing device architecture 1000 illustrated in FIG. 10 includes a processor 1002, memory components 1004, network connectivity components 1006, sensor components 1008, input/output components 1010, and power components 1012. In the illustrated configuration, the processor 1002 is in communication with the memory components 1004, the network connectivity components 1006, the sensor components 1008, the input/output ("I/O") components 1010, and the power components 1012. Although no connections are shown between the individuals components illustrated in FIG. 10, the components can interact to carry out device functions. In some configurations, the components are arranged so as to communicate via one or more busses (not shown).

The processor 1002 includes a central processing unit ("CPU") configured to process data, execute computer-executable instructions of one or more application programs, and communicate with other components of the computing device architecture 1000 in order to perform various functionality described herein. The processor 1002 may be utilized to execute aspects of the software components presented herein and, particularly, those that utilize, at least in part, a touch-enabled input.

In some configurations, the processor 1002 includes a graphics processing unit ("GPU") configured to accelerate operations performed by the CPU, including, but not limited to, operations performed by executing general-purpose scientific and/or engineering computing applications, as well as graphics-intensive computing applications such as high resolution video (e.g., 720P, 1080P, and higher resolution), video games, three-dimensional ("3D") modeling applications, and the like. In some configurations, the processor 1002 is configured to communicate with a discrete GPU (not shown). In any case, the CPU and GPU may be configured in accordance with a co-processing CPU/GPU computing model, wherein the sequential part of an application executes on the CPU and the computationally-intensive part is accelerated by the GPU.

In some configurations, the processor 1002 is, or is included in, a system-on-chip ("SoC") along with one or more of the other components described herein below. For example, the SoC may include the processor 1002, a GPU, one or more of the network connectivity components 1006, and one or more of the sensor components 1008. In some configurations, the processor 1002 is fabricated, in part, utilizing a package-on-package ("PoP") integrated circuit packaging technique. The processor 1002 may be a single core or multi-core processor.

The memory components 1004 include a random access memory ("RAM") 1014, a read-only memory ("ROM") 1016, an integrated storage memory ("integrated storage") 1018, and a removable storage memory ("removable storage") 1020. In some configurations, the RAM 1014 or a portion thereof, the ROM 1016 or a portion thereof, and/or some combination the RAM 1014 and the ROM 1016 is integrated in the processor 1002. In some configurations, the ROM 1016 is configured to store a firmware, an operating system or a portion thereof (e.g., operating system kernel), and/or a bootloader to load an operating system kernel from the integrated storage 1018 and/or the removable storage 1020.

The integrated storage 1018 can include a solid-state memory, a hard disk, or a combination of solid-state memory and a hard disk. The integrated storage 1018 may be soldered or otherwise connected to a logic board upon which the processor 1002 and other components described herein also may be connected. As such, the integrated storage 1018 is integrated in the computing device. The integrated storage 1018 is configured to store an operating system or portions thereof, application programs, data, and other software components described herein.

The removable storage 1020 can include a solid-state memory, a hard disk, or a combination of solid-state memory and a hard disk. In some configurations, the removable storage 1020 is provided in lieu of the integrated storage 1018. In other configurations, the removable storage 1020 is provided as additional optional storage. In some configurations, the removable storage 1020 is logically combined with the integrated storage 1018 such that the total available storage is made available as a total combined storage capacity. In some configurations, the total combined capacity of the integrated storage 1018 and the removable storage 1020 is shown to a user instead of separate storage capacities for the integrated storage 1018 and the removable storage 1020.

The removable storage 1020 is configured to be inserted into a removable storage memory slot (not shown) or other mechanism by which the removable storage 1020 is inserted and secured to facilitate a connection over which the removable storage 1020 can communicate with other components of the computing device, such as the processor 1002. The removable storage 1020 may be embodied in various memory card formats including, but not limited to, PC card, CompactFlash card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 1004 can store an operating system.

The network connectivity components 1006 include a wireless wide area network component ("WWAN component") 1022, a wireless local area network component ("WLAN component") 1024, and a wireless personal area network component ("WPAN component") 1026. The network connectivity components 1006 facilitate communications to and from the network 1056 or another network, which may be a WWAN, a WLAN, or a WPAN. Although only the network 1056 is illustrated, the network connectivity components 1006 may facilitate simultaneous communication with multiple networks. For example, the network connectivity components 1006 may facilitate simultaneous communications with multiple networks via one or more of a WWAN, a WLAN, or a WPAN.

The network 1056 may be or may include a WWAN, such as a mobile telecommunications network utilizing one or more mobile telecommunications technologies to provide voice and/or data services to a computing device utilizing the computing device architecture 1000 via the WWAN component 1022. The mobile telecommunications technologies can include, but are not limited to, Global System for Mobile communications ("GSM"), Code Division Multiple Access ("CDMA") ONE, CDMA7000, Universal Mobile Telecommunications System ("UMTS"), Long Term Evolution ("LTE"), and Worldwide Interoperability for Microwave Access ("WiMAX"). Moreover, the network 1056 may utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications may be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 1056 may be configured to provide voice and/or data communications with any combination of the above technologies. The network 1056 may be configured to or adapted to provide voice and/or data communications in accordance with future generation technologies.

In some configurations, the WWAN component 1022 is configured to provide dual-multi-mode connectivity to the network 1056. For example, the WWAN component 1022 may be configured to provide connectivity to the network 1056, wherein the network 1056 provides service via GSM and UMTS technologies, or via some other combination of technologies. Alternatively, multiple WWAN components 1022 may be utilized to perform such functionality, and/or provide additional functionality to support other non-compatible technologies (i.e., incapable of being supported by a single WWAN component). The WWAN component 1022 may facilitate similar connectivity to multiple networks (e.g., a UMTS network and an LTE network).

The network 1056 may be a WLAN operating in accordance with one or more Institute of Electrical and Electronic Engineers ("IEEE") 802.11 standards, such as IEEE 802.11a, 802.11b, 802.11g, 802.11n, and/or future 802.11 standard (referred to herein collectively as WI-FI). Draft 802.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 1024 is configured to connect to the network 1056 via the WI-FI access points. Such connections may be secured via various encryption technologies including, but not limited, WI-FI Protected Access ("WPA"), WPA2, Wired Equivalent Privacy ("WEP"), and the like.

The network 1056 may be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 1026 is configured to facilitate communications with other devices, such as peripherals, computers, or other computing devices via the WPAN.

The sensor components 1008 include a magnetometer 1028, an ambient light sensor 1030, a proximity sensor 1032, an accelerometer 1034, a gyroscope 1036, and a Global Positioning System sensor ("GPS sensor") 1038. It is contemplated that other sensors, such as, but not limited to, temperature sensors or shock detection sensors, also may be incorporated in the computing device architecture 1000.

The magnetometer 1028 is configured to measure the strength and direction of a magnetic field. In some configurations the magnetometer 1028 provides measurements to a compass application program stored within one of the memory components 1004 in order to provide a user with accurate directions in a frame of reference including the cardinal directions, north, south, east, and west. Similar measurements may be provided to a navigation application program that includes a compass component. Other uses of measurements obtained by the magnetometer 1028 are contemplated.

The ambient light sensor 1030 is configured to measure ambient light. In some configurations, the ambient light sensor 1030 provides measurements to an application program stored within one the memory components 1004 in order to automatically adjust the brightness of a display (described below) to compensate for low-light and high-light environments. Other uses of measurements obtained by the ambient light sensor 1030 are contemplated.

The proximity sensor 1032 is configured to detect the presence of an object or thing in proximity to the computing device without direct contact. In some configurations, the proximity sensor 1032 detects the presence of a user's body (e.g., the user's face) and provides this information to an application program stored within one of the memory components 1004 that utilizes the proximity information to enable or disable some functionality of the computing device. For example, a telephone application program may automatically disable a touchscreen (described below) in response to receiving the proximity information so that the user's face does not inadvertently end a call or enable/disable other functionality within the telephone application program during the call. Other uses of proximity as detected by the proximity sensor 1032 are contemplated.

The accelerometer 1034 is configured to measure proper acceleration. In some configurations, output from the accelerometer 1034 is used by an application program as an input mechanism to control some functionality of the application program. For example, the application program may be a video game in which a character, a portion thereof, or an object is moved or otherwise manipulated in response to input received via the accelerometer 1034. In some configurations, output from the accelerometer 1034 is provided to an application program for use in switching between landscape and portrait modes, calculating coordinate acceleration, or detecting a fall. Other uses of the accelerometer 1034 are contemplated.

The gyroscope 1036 is configured to measure and maintain orientation. In some configurations, output from the gyroscope 1036 is used by an application program as an input mechanism to control some functionality of the application program. For example, the gyroscope 1036 can be used for accurate recognition of movement within a 3D environment of a video game application or some other application. In some configurations, an application program utilizes output from the gyroscope 1036 and the accelerometer 1034 to enhance control of some functionality of the application program. Other uses of the gyroscope 1036 are contemplated.

The GPS sensor 1038 is configured to receive signals from GPS satellites for use in calculating a location. The location calculated by the GPS sensor 1038 may be used by any application program that requires or benefits from location information. For example, the location calculated by the GPS sensor 1038 may be used with a navigation application program to provide directions from the location to a destination or directions from the destination to the location. Moreover, the GPS sensor 1038 may be used to provide location information to an external location-based service, such as E911 service. The GPS sensor 1038 may obtain location information generated via WI-FI, WIMAX, and/or cellular triangulation techniques utilizing one or more of the network connectivity components 1006 to aid the GPS sensor 1038 in obtaining a location fix. The GPS sensor 1038 may also be used in Assisted GPS ("A-GPS") systems.

The I/O components 1010 include a display 1040, a touchscreen 1042, a data I/O interface component ("data I/O") 1044, an audio I/O interface component ("audio I/O") 1046, a video I/O interface component ("video I/O") 1048, and a camera 1050. In some configurations, the display 1040 and the touchscreen 1042 are combined. In some configurations two or more of the data I/O component 1044, the audio I/O component 1046, and the video I/O component 1048 are combined. The I/O components 1010 may include discrete processors configured to support the various interface described below, or may include processing functionality built-in to the processor 1002.

The display 1040 is an output device configured to present information in a visual form. In particular, the display 1040 may present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 1040 is a liquid crystal display ("LCD") utilizing any active or passive matrix technology and any backlighting technology (if used). In some configurations, the display 1040 is an organic light emitting diode ("OLED") display. Other display types are contemplated.

The touchscreen 1042, also referred to herein as a "touch-enabled screen," is an input device configured to detect the presence and location of a touch. The touchscreen 1042 may be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or may utilize any other touchscreen technology. In some configurations, the touchscreen 1042 is incorporated on top of the display 1040 as a transparent layer to enable a user to use one or more touches to interact with objects or other information presented on the display 1040. In other configurations, the touchscreen 1042 is a touch pad incorporated on a surface of the computing device that does not include the display 1040. For example, the computing device may have a touchscreen incorporated on top of the display 1040 and a touch pad on a surface opposite the display 1040.

In some configurations, the touchscreen 1042 is a single-touch touchscreen. In other configurations, the touchscreen 1042 is a multi-touch touchscreen. In some configurations, the touchscreen 1042 is configured to detect discrete touches, single touch gestures, and/or multi-touch gestures. These are collectively referred to herein as gestures for convenience. Several gestures will now be described. It should be understood that these gestures are illustrative and are not intended to limit the scope of the appended claims. Moreover, the described gestures, additional gestures, and/or alternative gestures may be implemented in software for use with the touchscreen 1042. As such, a developer may create gestures that are specific to a particular application program.

In some configurations, the touchscreen 1042 supports a tap gesture in which a user taps the touchscreen 1042 once on an item presented on the display 1040. The tap gesture may be used for various reasons including, but not limited to, opening or launching whatever the user taps. In some configurations, the touchscreen 1042 supports a double tap gesture in which a user taps the touchscreen 1042 twice on an item presented on the display 1040. The double tap gesture may be used for various reasons including, but not limited to, zooming in or zooming out in stages. In some configurations, the touchscreen 1042 supports a tap and hold gesture in which a user taps the touchscreen 1042 and maintains contact for at least a pre-defined time. The tap and hold gesture may be used for various reasons including, but not limited to, opening a context-specific menu.

In some configurations, the touchscreen 1042 supports a pan gesture in which a user places a finger on the touchscreen 1042 and maintains contact with the touchscreen 1042 while moving the finger on the touchscreen 1042. The pan gesture may be used for various reasons including, but not limited to, moving through screens, images, or menus at a controlled rate. Multiple finger pan gestures are also contemplated. In some configurations, the touchscreen 1042 supports a flick gesture in which a user swipes a finger in the direction the user wants the screen to move. The flick gesture may be used for various reasons including, but not limited to, scrolling horizontally or vertically through menus or pages. In some configurations, the touchscreen 1042 supports a pinch and stretch gesture in which a user makes a pinching motion with two fingers (e.g., thumb and forefinger) on the touchscreen 1042 or moves the two fingers apart. The pinch and stretch gesture may be used for various reasons including, but not limited to, zooming gradually in or out of a web site, map, or picture.

Although the above gestures have been described with reference to the use one or more fingers for performing the gestures, other appendages such as toes or objects such as styluses may be used to interact with the touchscreen 1042. As such, the above gestures should be understood as being illustrative and should not be construed as being limiting in any way.

The data I/O interface component 1044 is configured to facilitate input of data to the computing device and output of data from the computing device. In some configurations, the data I/O interface component 1044 includes a connector configured to provide wired connectivity between the computing device and a computer system, for example, for synchronization operation purposes. The connector may be a proprietary connector or a standardized connector such as USB, micro-USB, mini-USB, or the like. In some configurations, the connector is a dock connector for docking the computing device with another device such as a docking station, audio device (e.g., a digital music player), or video device.

The audio I/O interface component 1046 is configured to provide audio input and/or output capabilities to the computing device. In some configurations, the audio I/O interface component 1046 includes a microphone configured to collect audio signals. In some configurations, the audio I/O interface component 1046 includes a headphone jack configured to provide connectivity for headphones or other external speakers. In some configurations, the audio I/O interface component 1046 includes a speaker for the output of audio signals. In some configurations, the audio I/O interface component 1046 includes an optical audio cable out.

The video I/O interface component 1048 is configured to provide video input and/or output capabilities to the computing device. In some configurations, the video I/O interface component 1048 includes a video connector configured to receive video as input from another device (e.g., a video media player such as a DVD or BLURAY player) or send video as output to another device (e.g., a monitor, a television, or some other external display). In some configurations, the video I/O interface component 1048 includes a High-Definition Multimedia Interface ("HDMI"), mini-HDMI, micro-HDMI, DisplayPort, or proprietary connector to input/output video content. In some configurations, the video I/O interface component 1048 or portions thereof is combined with the audio I/O interface component 1046 or portions thereof.

The camera 1050 can be configured to capture still images and/or video. The camera 1050 may utilize a charge coupled device ("CCD") or a complementary metal oxide semiconductor ("CMOS") image sensor to capture images. In some configurations, the camera 1050 includes a flash to aid in taking pictures in low-light environments. Settings for the camera 1050 may be implemented as hardware or software buttons.

Although not illustrated, one or more hardware buttons may also be included in the computing device architecture 1000. The hardware buttons may be used for controlling some operational aspect of the computing device. The hardware buttons may be dedicated buttons or multi-use buttons. The hardware buttons may be mechanical or sensor-based.

The illustrated power components 1012 include one or more batteries 1052, which can be connected to a battery gauge 1054. The batteries 1052 may be rechargeable or disposable. Rechargeable battery types include, but are not limited to, lithium polymer, lithium ion, nickel cadmium, and nickel metal hydride. Each of the batteries 1052 may be made of one or more cells.

The battery gauge 1054 can be configured to measure battery parameters such as current, voltage, and temperature. In some configurations, the battery gauge 1054 is configured to measure the effect of a battery's discharge rate, temperature, age and other factors to predict remaining life within a certain percentage of error. In some configurations, the battery gauge 1054 provides measurements to an application program that is configured to utilize the measurements to present useful power management data to a user. Power management data may include one or more of a percentage of battery used, a percentage of battery remaining, a battery condition, a remaining time, a remaining capacity (e.g., in watt hours), a current draw, and a voltage.

The power components 1012 may also include a power connector, which may be combined with one or more of the aforementioned I/O components 1010. The power components 1012 may interface with an external power system or charging equipment via an I/O component.

Based on the foregoing, it should be appreciated that concepts and technologies have been disclosed herein that provide, among other techniques, enhanced control of one or more robots. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example configurations and applications illustrated and described, and without departing from the true spirit and scope of the present invention, which is set forth in the following claims.

The disclosure presented herein also encompasses the subject matter set forth in the following clauses:

Clause 1: A computer-implemented method of managing a robotic device using variable autonomous control, comprising:
  receiving data indicative of an area proximate to the robotic device;
  based on the data, generating a scene;
  accessing a knowledge database having contextual and semantic labels for assisting the robotic device in executing tasks in context of one or more scenes;
  based on the knowledge database, identifying a task associated with the scene;
  dividing the task into sub-tasks;
  determining a risk threshold based on the scene, the sub-tasks, and one or more trust thresholds;
  based on the risk threshold, determining a ratio of the sub-tasks to be controlled by a user;
  in accordance with the risk threshold, receiving a user input for controlling one or more of the sub-tasks when the ratio dictates that at least one of the sub-tasks requires the user input; and
  causing performance of the sub-tasks by the robotic device;
  wherein the ratio is progressively updated over time based on updates to the knowledge database and the risk threshold.

Clause 2: The method of clause 1, wherein the knowledge database is generated using machine learning.

Clause 3: The method of any of clauses 1-2, wherein the task is determined based on a motion planning algorithm, further comprising generating alternative motion plans based on the contextual and semantic labels.

Clause 4: The method of any of clauses 1-3, wherein the scene is generated by:
  generating a digital twin and identifying objects within the digital twin;
  accessing, from the knowledge database, information about the identified objects;
  identifying a set of potential scenes based on a context of the objects; and
  selected a likeliest scene of the set of potential scenes.

Clause 5: The method of any of clauses 1-4, wherein the task is identified by evaluating and selecting a task from a set of potential tasks.

Clause 6: The method of any of clauses 1-5, further comprising simulating and evaluating a result of the task execution.

Clause 7: The method of clauses 1-6, wherein the user input comprises a feedback loop with the user when user input is needed.

Clause 8: The method of any of clauses 1-7, wherein:
  the scene is generated by generating a digital twin and identifying objects within the digital twin; and
  the user input is received via a user interface to the digital twin.

Clause 9: The method of clauses 1-8, further comprising determining one or more intervention objectives usable to determine the task based on the scene.

Clause 10: The method of clauses 1-9, wherein the task comprises one or more constraints or characteristics for the task.

Clause 11: The method of clauses 1-10, further comprising:
  generating a pre-execution virtual scene and proposed task sequence for presentation to the user; and
  receiving the trust threshold via the user input.

Clause 12: The method of clauses 1-11, wherein the risk threshold is indicative a level of autonomy defined as one of full manual, augmented control, semi-autonomous, or fully-autonomous.

Clause 13: The method of clauses 1-12, wherein the updates to the knowledge database are generated based on user feedback and assessment of performance of the task.

Clause 14: An autonomous device configured to:
  based on data indicative of an area proximate to the autonomous device, generate a scene;
  based on information from a knowledge database, identify a task associated with the scene, the knowledge database including contextual and semantic labels for assisting the autonomous device in executing tasks in context of the scene;
  determine a risk threshold based on the scene, the task, and one or more trust thresholds;
  based on the risk threshold, determine a ratio of sub-tasks of the task to be controlled by a user;
  in accordance with the risk threshold, receive a user input for controlling one or more of the sub-tasks when the ratio dictates that at least one of the sub-tasks requires user intervention; and
  perform the sub-tasks.

Clause 15: The system of clause 14, wherein the ratio is progressively updated over time based on updates to the knowledge database and the risk threshold.

Clause 16: A system comprising:
  a memory storing thereon instructions that when executed by a processor of the system, cause the system to perform operations comprising:
  receiving data indicative of an area proximate to a robotic device;
  based on the data, generating a scene;
  accessing a knowledge database having contextual and semantic labels for assisting the robotic device in executing tasks in context of one or more scenes;
  based information from the knowledge database, identifying a task associated with the scene;
  dividing the task into sub-tasks;
  determining a risk threshold based on the scene, the sub-tasks, and one or more trust thresholds;
  based on the risk threshold, determining a ratio of the sub-tasks to be controlled by a user;
  in accordance with the risk threshold, receiving a user input for controlling one or more of the sub-tasks when the ratio dictates that at least one of the sub-tasks requires the user input; and
  causing performance of the sub-tasks by the robotic device;

wherein the ratio is progressively updated over time based on updates to the knowledge database and the risk threshold.

Clause 17: The computer-readable storage medium of clause 16, wherein the scene is generated by:
generating a digital twin and identifying objects within the digital twin;
accessing, from the knowledge database, information about the identified objects;
identifying a set of potential scenes based on a context of the objects; and
selected a likeliest scene of the set of potential scenes.

Clause 18: The computer-readable storage medium of any of clauses 16 and 17, wherein the task is identified by evaluating and selecting a task from a set of potential tasks, further comprising instructions that when executed by a processor of the system, cause the system to perform operations comprising:
simulating and evaluating a result of the task execution.

Clause 19: The computer-readable storage medium of any of the clauses 16-18, wherein the user input comprises a feedback loop with the user when user input is needed.

Clause 20: The computer-readable storage medium of any of the clauses 16-19, further comprising instructions that when executed by a processor of the system, cause the system to perform operations comprising:
generating a pre-execution virtual scene and proposed task sequence for presentation to the user; and
receiving the trust threshold via the user input.

What is claimed is:

1. A computer-implemented method of managing a robotic device using variable autonomous control, comprising:
receiving data indicative of an area proximate to the robotic device;
based on the data, generating a scene by:
generating a digital twin and identifying objects within the digital twin;
accessing, from a knowledge database, information about the identified objects;
identifying a set of potential scenes based on a context of the objects; and
selecting a likeliest scene of the set of potential scenes;
accessing the knowledge database having contextual and semantic labels for assisting the robotic device in executing tasks in context of one or more scenes;
based on the knowledge database, identifying a task associated with the scene;
dividing the task into sub-tasks;
determining a risk threshold based on the scene, the sub-tasks, and one or more trust thresholds;
based on the risk threshold, determining a ratio of the sub-tasks to be controlled by a user;
in accordance with the risk threshold, receiving a user input for controlling one or more of the sub-tasks when the ratio dictates that at least one of the sub-tasks requires the user input; and
causing performance of the sub-tasks by the robotic device;
wherein the ratio is progressively updated over time based on updates to the knowledge database and the risk threshold.

2. The computer-implemented method of claim 1, wherein the knowledge database is generated using machine learning.

3. The computer-implemented method of claim 1, wherein the task is determined based on a motion planning algorithm, further comprising generating alternative motion plans based on the contextual and semantic labels.

4. The computer-implemented method of claim 1, wherein the updates to the knowledge database are generated based on user feedback and assessment of performance of the task.

5. The computer-implemented method of claim 1, wherein the task is identified by evaluating and selecting a task from a set of potential tasks.

6. The computer-implemented method of claim 5, further comprising simulating and evaluating a result of the task from the set of potential tasks.

7. The computer-implemented method of claim 1, wherein the user input comprises a feedback loop with the user when user input is needed.

8. The computer-implemented method of claim 1, wherein:
the scene is generated by generating a digital twin and identifying objects within the digital twin; and
the user input is received via a user interface to the digital twin.

9. The computer-implemented method of claim 1, further comprising determining one or more intervention objectives usable to determine the task based on the scene.

10. The computer-implemented method of claim 1, wherein the task comprises one or more constraints or characteristics for the task.

11. The computer-implemented method of claim 1, further comprising:
generating a pre-execution virtual scene and proposed task sequence for presentation to the user; and
receiving the trust threshold via the user input.

12. The computer-implemented method of claim 1, wherein the risk threshold is indicative a level of autonomy defined as one of full manual, augmented control, semi-autonomous, or fully-autonomous.

13. An autonomous device configured to:
based on data indicative of an area proximate to the autonomous device, generate a scene [,] by:
generating a digital twin and identifying objects within the digital twin;
accessing, from a knowledge database, information about the identified objects;
identifying a set of potential scenes based on a context of the objects; and
selecting a likeliest scene of the set of potential scenes;
based on information from the knowledge database, identify a task associated with the scene, the knowledge database including contextual and semantic labels for assisting the autonomous device in executing tasks in context of the scene;
determine a risk threshold based on the scene, the task, and one or more trust thresholds;
based on the risk threshold, determine a ratio of sub-tasks of the task to be controlled by a user;
in accordance with the risk threshold, receive a user input for controlling one or more of the sub-tasks when the ratio dictates that at least one of the sub-tasks requires user intervention; and
perform the sub-tasks.

14. The autonomous device of claim 13, wherein the ratio is progressively updated over time based on updates to the knowledge database and the risk threshold.

15. A system comprising:
a memory storing thereon instructions that when executed by a processor of the system, cause the system to perform operations comprising:

receiving data indicative of an area proximate to a robotic device;
based on the data, generating a scene by:
 generating a digital twin and identifying objects within the digital twin;
 accessing, from a knowledge database, information about the identified objects;
 identifying a set of potential scenes based on a context of the objects; and
 selecting a likeliest scene of the set of potential scenes;
accessing the knowledge database having contextual and semantic labels for assisting the robotic device in executing tasks in context of one or more scenes;
based information from the knowledge database, identifying a task associated with the scene;
dividing the task into sub-tasks;
determining a risk threshold based on the scene, the sub-tasks, and one or more trust thresholds;
based on the risk threshold, determining a ratio of the sub-tasks to be controlled by a user;
in accordance with the risk threshold, receiving a user input for controlling one or more of the sub-tasks when the ratio dictates that at least one of the sub-tasks requires the user input; and
causing performance of the sub-tasks by the robotic device;
wherein the ratio is progressively updated over time based on updates to the knowledge database and the risk threshold.

16. The system of claim 15, wherein the user input comprises a feedback loop with the user when user input is needed.

17. The system of claim 16, further comprising instructions that when executed by a processor of the system, cause the system to perform operations comprising:
 generating a pre-execution virtual scene and proposed task sequence for presentation to the user; and
 receiving the trust threshold via the user input.

18. The system of claim 15, wherein the task is identified by evaluating and selecting a task from a set of potential tasks, further comprising instructions that when executed by a processor of the system, cause the system to perform operations comprising:
 simulating and evaluating a result of the task from the set of potential tasks.

* * * * *